United States Patent
Hollander et al.

(10) Patent No.: US 9,662,262 B2
(45) Date of Patent: May 30, 2017

(54) JOINT TORQUE AUGMENTATION SYSTEM AND METHOD FOR GAIT ASSISTANCE

(71) Applicant: SpringActive, Inc., Tempe, AZ (US)

(72) Inventors: Kevin Hollander, Scottsdale, AZ (US);
Nathan Cahill, Tempe, AZ (US);
Darren Kinney, Phoenix, AZ (US);
Preston Clouse, Mesa, AZ (US);
Robert Holgate, Flagstaff, AZ (US);
Raymond Churchwell, Phoenix, AZ (US)

(73) Assignee: SpringActive, Inc., Tempe, AZ (US)

( * ) Notice: Subject to any disclaimer, the term of this patent is extended or adjusted under 35 U.S.C. 154(b) by 0 days.

(21) Appl. No.: 14/271,259

(22) Filed: May 6, 2014

(65) Prior Publication Data

US 2014/0330431 A1   Nov. 6, 2014

Related U.S. Application Data

(60) Provisional application No. 61/819,742, filed on May 6, 2013, provisional application No. 61/884,075, filed on Sep. 29, 2013.

(51) Int. Cl.
*A61H 3/00* (2006.01)
*B25J 9/00* (2006.01)

(52) U.S. Cl.
CPC .............. *A61H 3/00* (2013.01); *B25J 9/0006* (2013.01); *Y10T 29/49826* (2015.01)

(58) Field of Classification Search
CPC .................. A61H 3/00; A61H 2205/10; A61H 2205/102; A61H 2205/106;

(Continued)

(56) References Cited

U.S. PATENT DOCUMENTS 3,967,321 A * 7/1976 Ryan ..................... A61F 5/013
602/22
7,811,333 B2   10/2010 Jonsson et al.
(Continued)

FOREIGN PATENT DOCUMENTS

WO      2011096965 A2     8/2011

OTHER PUBLICATIONS

Bernardi, M. et al., (1995), "The Efficiency of Walking of Paraplegic Patients Using a Reciprocating Gait Orthosis," Spinal Cord 33(7): 409-415.

(Continued)

*Primary Examiner* — Adam Mott
(74) *Attorney, Agent, or Firm* — Robert D. Atkins; Atkins and Associates, P.C.

(57) ABSTRACT

A joint torque augmentation system includes linkage assembly configured to couple to a user. Linkage assembly includes a unidirectional link and a device joint. The linkage assembly is worn by a user or is configured to couple to footwear. An actuator is coupled to the linkage assembly to provide a torque at a joint of the user. A sensor is coupled to the user to measure a position of the user. A control system is coupled to the sensor and actuator. A phase of gait for the user is determined by the control system based on the position measured by the sensor. The actuator produces a tension force on the linkage assembly during a first phase of gait. A compliant element is coupled between the actuator and linkage assembly. The compliant element is tuned based on a load carried by the user.

24 Claims, 26 Drawing Sheets

(58) Field of Classification Search
CPC .............. A61H 2205/108; A61H 1/024; A61H
1/0244; A61H 1/0255; A61H 1/0266;
A61H 1/0237; A61H 2003/007; A61H
2201/164; A61H 2201/1645; A61H
2201/165; A61H 2201/00; A61H
2001/0203; A61F 5/01; A61F 5/0102;
A61F 5/0123; A61F 5/0125; A61F
5/0127; A61F 5/0111; A61F 2/605; A61F
2/64; A61F 2/66; A61F 2/6607; A61F
2002/607; A61F 2002/608; B25J 9/0006
See application file for complete search history.

(56) References Cited

U.S. PATENT DOCUMENTS

| | | | |
|---|---|---|---|
| 8,057,550 B2 | 11/2011 | Clausen et al. | |
| 8,287,477 B1* | 10/2012 | Herr | A61B 5/1038 602/16 |
| 2005/0070834 A1 | 3/2005 | Herr et al. | |
| 2010/0161077 A1 | 6/2010 | Boone et al. | |
| 2010/0280629 A1* | 11/2010 | Jung | A61H 3/00 623/53 |
| 2011/0112447 A1* | 5/2011 | Hsiao-Wecksler | A61H 1/0266 601/33 |
| 2013/0046218 A1* | 2/2013 | Wiggin et al. | 602/16 |
| 2014/0212243 A1* | 7/2014 | Yagi | A61H 3/00 414/2 |
| 2014/0260950 A1* | 9/2014 | Cook | A61F 2/68 91/418 |
| 2015/0173993 A1* | 6/2015 | Walsh | A61H 1/024 414/4 |

OTHER PUBLICATIONS

Boehler, Alexander W. et al., (2008), "Design, Implementation and Test Results of a Robust Control Algorithm for a Powered Ankle Foot Orthosis," IEEE International Conference on Robotics and Automation (ICRA), IEEE.

Hitt, Joseph et al., (2010), "Dismounted Soldier Biomechanical Power Regeneration Kit (SPaRK)," Proceedings of the 27th Army Science Conference, Orlando, FL.

Hitt, Joseph et al., (2010), "Bionic Running for Unilateral Transtibial Military Amputees," Proceedings of the 27th Army Science Conference, Orlando, FL.

Hollander, Kevin W. et al., (2005), "A Robotic "Jack Spring" for Ankle Gait Assistance," DETC2005-84492, ASME International Design Engineering Technical Conference (IDETC2005), Long Beach, CA, American Society of Mechanical Engineers.

Hollander, Kevin W. et al., (2006), "An Efficient Robotic Tendon for Gait Assistance," Journal of biomechanical engineering 128: 788.

Kawamoto, Hiroaki et al., (2003), "Power Assist Method for HAL-3 Estimating Operator's Intention Based on Motion Information," IEEE International Workshop on Robot and Human Interactive Communication, Millbrae, CA.

Kazerooni, H. et al., (2005), "On the Control of the Berkeley Lower Extremity Exoskeleton (BLEEX)," Proceedings of the 2005 IEEE International Conference on Robotics and Automation, Barcelona, Spain, Apr. 2005.

Norris, James A. et al., (2007), "Effect of Augmented Plantarflexion Power on Preferred Walking Speed and Economy in Young and Older Adults," Gait & Posture 25(4): 620-627.

Sawicki, Gregory S. et al., (2009), "Mechanics and Energetics of Incline Walking with Robotic Ankle Exoskeletons," Journal of Experimental Biology 212(1).

Sawicki, Gregory S. et al., (2009), "Powered Ankle Exoskeletons Reveal the Metabolic Cost of Plantar Flexor Mechanical Work During Walking with Longer Steps at Constant Step Frequency," Journal of Experimental Biology 212(1).

Sawicki, Gregory S. et al., (2009), "It Pays to Have a Spring in your Step," Exercise and Sport Sciences Reviews 37 (3).

Sugar, Thomas G., (2002), "A Novel Selective Compliant Actuator," Mechatronics 12(9-10): 1157-1171.

Walsh, Conor James et al., "Development of a Lightweight, Under-Actuated Exoskeleton for Load-Carrying Augmentation," Proceedings of the 2006 IEEE International Conference on Robotics and Automation, Orlando, Florida, May 2006.

Walsh, Conor James et al., (2006), Biomimetic Design of an Under-Actuated Leg Exoskeleton for Load-Carrying Augmentation, Cambridge, MA, Massachusetts Inst of Tech, M.S.

Ward, Jeffrey et al., (2007), "Robotic Gait Trainer Reliability and Stroke Patient Case Study," IEEE 10th International Conference on Rehabilitation Robotics (ICORR), Holland.

Ward, Jeffrey et al., (2008), "Control Architectures for a Powered Ankle Foot Orthsosis," International Journal of Assistive Robotics and Mechatronics 9(2): 2-13.

Ward, Jeffrey et al., (2010), "Stroke Survivor Gait Adaptation and Performance After Training on a Powered Ankle Foot Orthosis," Proceedings of the IEEE International Conference on Robotics and Automation (ICRA), Anchorage, AK, IEEE.

Ward Jeffrey et al., (2011), "Using the Translational Potential Energy of Springs for Prosthetic Systems," IEEE Multi-conference on Systems and Control, Denver, CO, IEEE.

Ferris, Daniel P. et al., "An Ankle-Foot Orthosis Powered by Artificial Pneumatic Muscles", Journal of Applied Biomechanics, vol. 21, pp. 189-197, 2005 Human Kinetics Publishers, Inc.

Hollander, Kevin W. et al., "An Efficient Robotic Tendon for Gait Assistance", J. Biomech. Eng., 128(5):788-91, Oct. 2006.

Kazerooni, H., et al, "That Which Does Not Stabilize, Will Only Make Us Stronger", The International Journal of Robotics Research, pp. 75-89, Jan. 2007.

Shorter, Alex K. et al., "A Portable Powered Ankle-Foot Orthosis for Rehabilitation", Journal of Rehabilitation Research & Development, vol. 48, No. 4, pp. 459-472, 2011.

Hitt, J. et al., "Robotic Transtibial Prosthesis with Biomechanical Energy Regeneration", Industrial Robot: An International Journal, vol. 36, Issue 5, pp. 441-447, 2009.

Hitt, J. et al., "The SPARKy (Spring Ankle with Regenerative Kinetics) Project: Design and Analysis of a Robotic Transtibial Prosthesis with Regenerative Kinetics", ASME International Design Engineering Technical Conferences & Computers and Information in Engineering Conference (IDETC/CIE), CD-ROM, pp. 1-10, 2007.

Holgate, M. et al., "Control Algorithms for Ankle Robots: A Reflection on the State-of-the-Art and Presentation of Two Novel Algorithms", 2nd IEEE RAS & EMBS International Conference on Biomedical Robotics and Biomechatronics, pp. 97-103, 2008.

Holgate, M. et al., "The SPARKy (Spring Ankle with Regenerative Kinetics) Project: Choosing a DC Motor Based Actuation Method" 2nd IEEE RAS & EMBS International Conference on Biomedical Robotics and Biomechatronics, pp. 163-168, 2008.

* cited by examiner

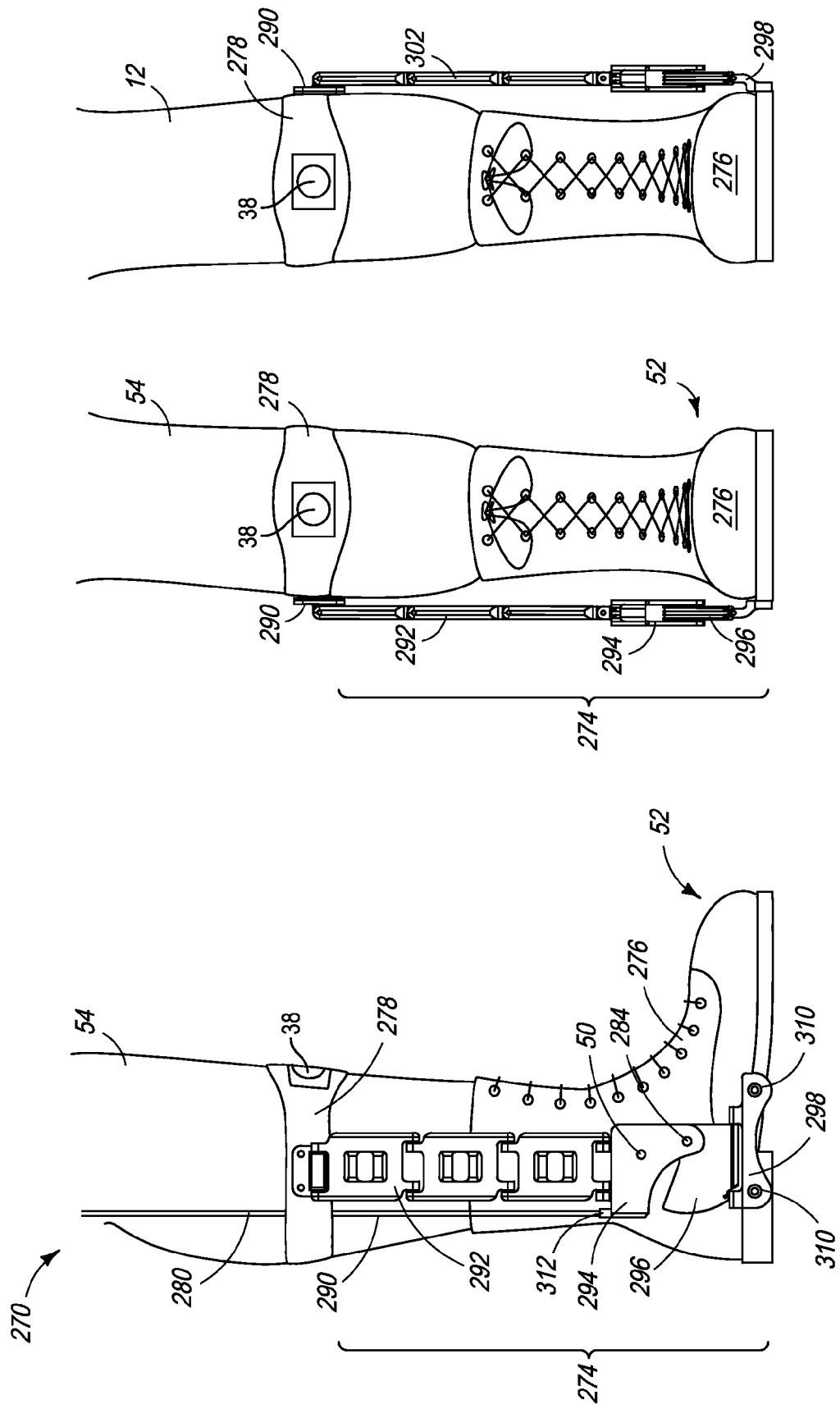

JOINT TORQUE AUGMENTATION SYSTEM AND METHOD FOR GAIT ASSISTANCE

CLAIM TO DOMESTIC PRIORITY

The present application claims the benefit of U.S. Provisional Application No. 61/819,742, filed May 6, 2013, and U.S. Provisional Application No. 61/884,075, filed Sep. 29, 2013, which applications are incorporated herein by reference.

FEDERALLY-SPONSORED RESEARCH OR DEVELOPMENT

The present invention was made with government support under grant number W911QX-13-C-0014, awarded by the Army Research Labs. The government has certain rights in the invention.

FIELD OF THE INVENTION

The present invention relates in general to gait assistance systems and particularly to joint torque augmentation systems for gait assistance.

BACKGROUND OF THE INVENTION

Human locomotion, such as walking and running, is commonly described in terms of gait. Gait is a cyclical or reoccurring pattern of leg and foot movement, rotations, and torques that creates locomotion. Due to the repetitive nature of gait, gait is typically analyzed in terms of percentages of a gait cycle. A gait cycle is defined for a single leg beginning with the initial contact of the foot with a surface such as the ground. The initial contact of the foot on the ground is referred to as a heel strike. The conclusion of a gait cycle occurs when the same foot makes a second heel strike. A gait cycle can be divided into two phases: stance phase and swing phase. Stance phase describes the part of the gait cycle where the foot is in contact with the ground. Stance phase begins with heel strike and ends when the toe of the same foot leaves the ground. Swing phase describes the part of the gait cycle where the foot is in the air and not in contact with the ground. Swing phase begins when the foot leaves contact with the ground and ends with the heel strike of the same foot. For walking gait speed, stance phase typically describes the first 60% of the gait cycle, while swing phase describes the remaining 40% of the gait cycle.

Individuals have unique gait patterns. Energy or metabolic expenditure during an individual's gait depends on several factors including, body mass, stride length, step rate, and other physical and environmental factors. Individuals have physical and metabolic limits, which determine the speed and distance an individual can travel on foot. Decreasing the metabolic cost for an individual's gait allows the individual to run faster or travel for a longer distance while minimizing the energy expended by the individual.

Fatigue and injury can result from overuse or from strenuous activity, such as long distance walking and load carrying. Carrying significant loads over long distances and time periods can lead to fatigue and cause musculoskeletal injuries. Various types of jobs require people to carry loads. Military personnel are considered particularly at risk for fatigue and injury from carrying loads. As the quantity and complexity of gear used in military duty has increased, the weight of loads carried by military personnel has also increased. Many soldiers carry a variety of devices, such as night goggles, global positioning systems (GPS), body armor, and other gear. Although maximum loads are recommended, the recommended maximums are typically exceeded. Typical loads carried by soldiers can range between 45 kilograms (kg) to 60 kg or more. Soldiers often carry the loads for long distances while marching on foot.

The relationship between distance traveled and the rate of metabolic energy expended is exponential in nature. The metabolic cost of gait depends on the speed of gait and the weight of a load carried by the individual. When carrying a heavier load, the speed of a march is decreased in order to avoid fatigue. Fatigue has been shown to have detrimental effects on individuals who carry the heavy loads. Fatigue is known to increase likelihood of acute injury by raising the potential for trips and falls. Fatigue can also affect mental focus, reduce situational awareness, and negatively impact overall physical and mental performance. Non-combat related injuries caused by carrying significant loads are also a problem. Long term and chronic overuse injuries account for a significant amount of injuries for soldiers.

Various types of structures and exoskeletons have been proposed to support or lessen loads carried. Current load assistance structures are known to perturb the user's gait and negatively affect metabolic expenditure. Interference with gait creates inefficiencies in energy transfer by altering the fluidity of the gait motion. Disruption of the natural gait step causes an increase in metabolic cost. Altering an individual's gait dynamics also increases the likelihood of acute and chronic injury.

SUMMARY OF THE INVENTION

A need exists for a wearable system that augments joint torque while allowing for substantially unencumbered gait and movement. Accordingly, in one embodiment, the present invention is a method of making a joint torque augmentation device comprising the steps of providing linkage assembly configured to couple to a user, providing an actuator coupled to the linkage assembly to provide a torque at a joint of the user, and coupling a compliant element to the actuator.

In another embodiment, the present invention is a method of augmenting joint torque comprising the steps of providing a linkage assembly configured to couple to a user, providing a sensor, measuring a position of the user, providing an actuator coupled to the linkage assembly, and controlling a position of the actuator based on the position of the user to produce a torque at a joint of the user.

In another embodiment, the present invention is a joint torque augmentation device comprising a linkage assembly including a first joint. A unidirectional link is coupled to the linkage assembly. A first actuator is coupled to the unidirectional link to produce a torque at the device joint.

In another embodiment, the present invention is a joint torque augmentation device comprising a linkage assembly configured to couple to a user. An actuator is coupled to the linkage assembly to apply a torque to a joint of the user.

BRIEF DESCRIPTION OF THE DRAWINGS

FIGS. 17a-17b illustrate a joint torque augmentation system for an ankle joint;

DETAILED DESCRIPTION OF THE DRAWINGS

The present invention is described in one or more embodiments in the following description with reference to the figures, in which like numerals represent the same or similar elements. While the invention is described in terms of the best mode for achieving the invention's objectives, those skilled in the art will appreciate that the description is intended to cover alternatives, modifications, and equivalents as may be included within the spirit and scope of the invention as defined by the appended claims and their equivalents as supported by the following disclosure and drawings.

Figure 1:
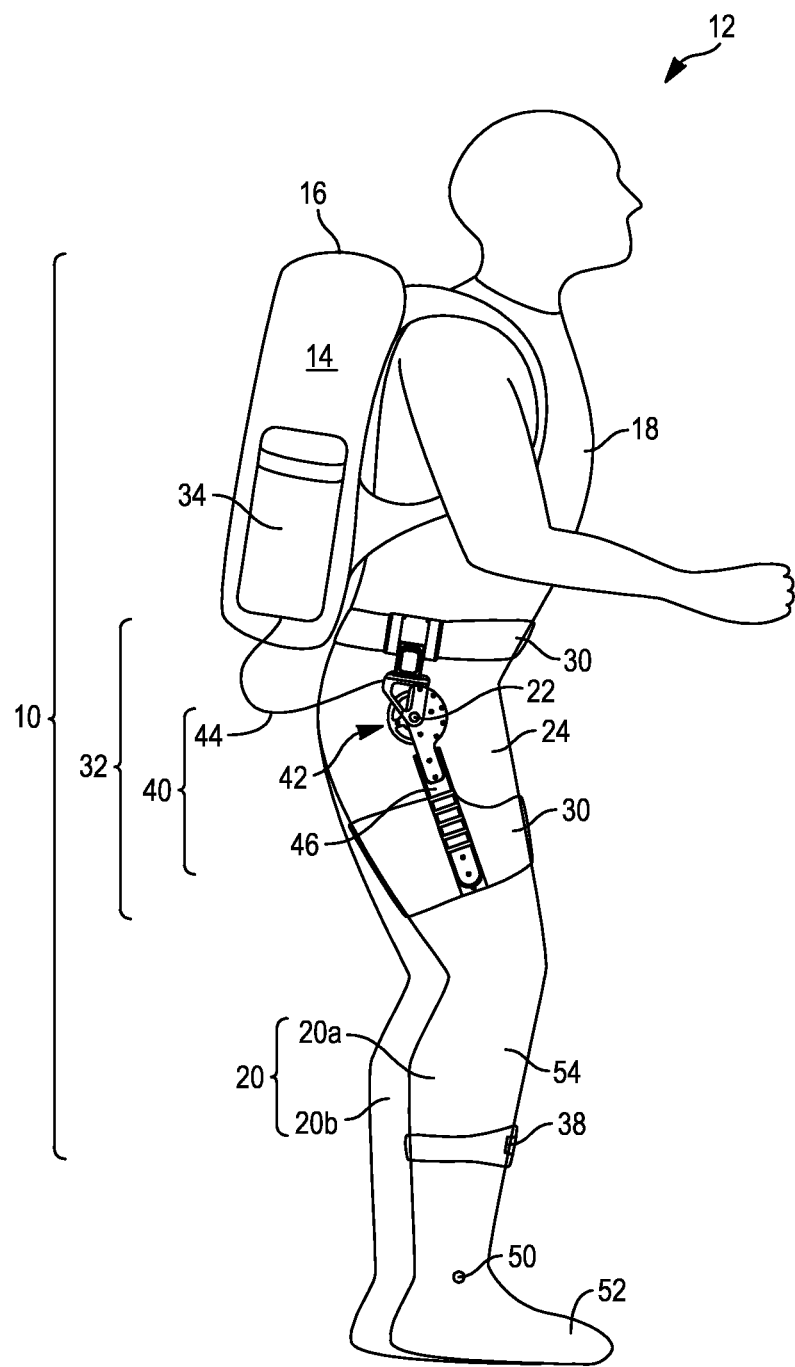
FIG. 1 illustrates a joint torque augmentation system for a hip joint.

FIG. 1 shows a joint torque augmentation system 10 worn by user 12. A wearable device is disclosed for assisting a user with the movements associated with human gait by augmenting torque at the hip joint. A user may carry a load 14 using a backpack 16 worn on a torso 18 of user 12. Wearing load 14 increases the metabolic requirements for user 12 to move, increases the user's rate of fatigue, and reduces the distance user 12 is able to travel by foot. User 12 wears a joint torque augmentation system 10 in order to add assistive energy to the user's step and reduce the metabolic cost of gait. Joint torque augmentation system 10 is worn in proximity to legs 20 and hip joint 22 of user 12 in order to add a force or torque to the motion of the user's legs 20.

Adding force or torque at specific timing during the user's gait reduces metabolic energy required from user 12 to produce a gait step. In one embodiment, joint torque augmentation system 10 applies a force or torque near each hip joint 22 of user 12 during the swing phase each gait step for each leg 20. Applying torque, for example, to an upper leg 24 during swing phase assists user 12 with hip flexion. In another embodiment, joint torque augmentation system 10 applies a force or torque near each hip joint 22 of user 12 during the stance phase each gait step. Applying torque, for example, to an upper leg 24 during stance phase assists user 12 with hip extension and the lifting of the body that occurs during early stance. In yet another embodiment, joint torque augmentation system 10 applies a force or torque in alternating directions during stance and swing phase to assist the user's motion during both stance and swing phases. Applying torque during stance and swing phases results in joint torque augmentation to assist with hip extension during stance phase and hip flexion during swing phase.

Joint torque augmentation system 10 includes an attachment assembly 30, a linkage assembly 32, and a control assembly or control system 34 including an actuator 36 and a sensor 38. A joint torque augmentation system 10 is worn on each leg 20 of user 12. Therefore, user 12 wears one or more joint torque augmentation systems 10 to assist with gait. Each joint torque augmentation system 10 on each leg 20 provides unidirectional or multidirectional force or torque. Attachment assembly 30 and linkage assembly 32 are configured to allow mobility and a natural range or motion for user 12 without encumbering or restricting the user's gait.

Attachment assembly 30 provides for wearability of linkage assembly 32 and control assembly 34 and transfers the forces from control assembly 34 through linkage assembly 32 to the limbs and joints of user 12. In one embodiment, user 12 wears attachment assembly 30 on torso 18 and upper legs or thighs 24. Attachment assembly 30 is secured to user 12 at two attachment points, torso 18 and thighs 24, with hip joint 22 located in between the two attachment points. Attachment assembly 30 is disposed in proximity to hip joint 22 to position linkage assembly 32 of joint torque augmentation system 10 in order to apply torque at hip joint 22. Attachment assembly 30 is adjustable in order for joint torque augmentation system 10 to fit onto different users.

Joint torque augmentation system 10 includes a linkage assembly 32, which transfers a force from control assembly 34 into a torque or force directed at a limb or joint of user 12. Linkage assembly 32 is adjustable in order to position the applied torque from joint torque augmentation system 10 at an optimal location on user 12. In one embodiment, linkage assembly 32 includes pulley system 40 comprising a pulley carriage 42, a cable 44, and supporting links 46. In another embodiment, linkage assembly 32 includes an assembly of rigid members. In yet another embodiment, linkage assembly 32 includes assembly of rigid members and compliant elements.

Joint torque augmentation system 10 includes a control assembly 34 configured to apply a force or torque to user 12 through linkage assembly 32. Control assembly 34 generally includes an actuator assembly or actuator 36, a controller, and a sensor 38. A sensor, plurality of sensors, or sensor system 38 is coupled to user 12 and may be attached to a user's torso 18, ankle 50, leg 20, foot 52, or another part of user 12. Additional sensors 38 may be coupled to control assembly 34. In one embodiment, sensor 38 is worn on each leg 20 of user 12 and is attached at the lower leg or tibia 54 of each leg 20. Sensor 38 continuously measures a user's movement or inertial information about user 12 to determine information about the user's gait, such as gait speed, stride length, or percent of gait cycle.

Sensor 38 is coupled to control system 34 wirelessly or by wired connection. Control assembly 34 receives and processes the measurements from sensor 38. Control assembly 34 interprets the continuous measurements from sensor 38 and commands a path for actuator 36 to move linkage assembly 32. Control assembly 34 selects a path for actuator 36 according to the inertia or expected motion of user 12 by comparing the continuous measurements from sensor 38 to able-bodied data. The movement of linkage assembly 32 produces an external force that acts on user 12. Control assembly 34 ensures joint torque augmentation system 10 provides an external force that applies torque to hip joint 22 at proper timing to assist user 12 with gait.

Figure 2A:
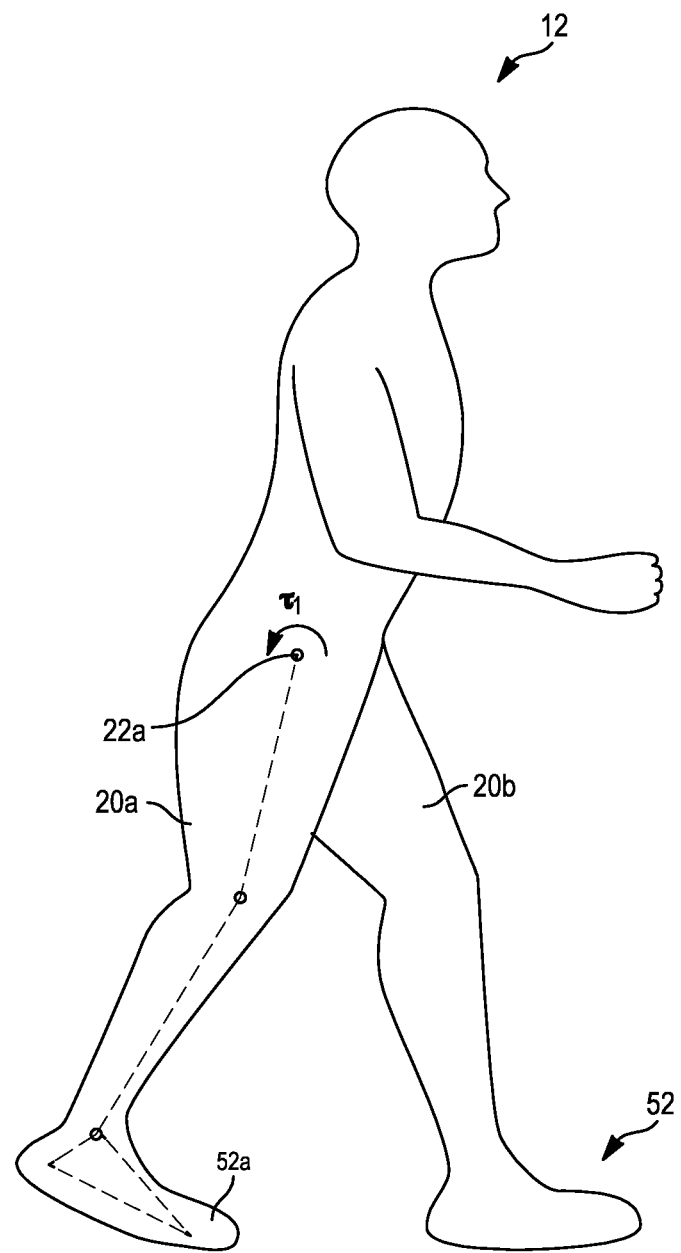
FIGS. 2a-2b illustrate a schematic representation of a joint torque augmentation system for a hip joint.
Figure 2B:
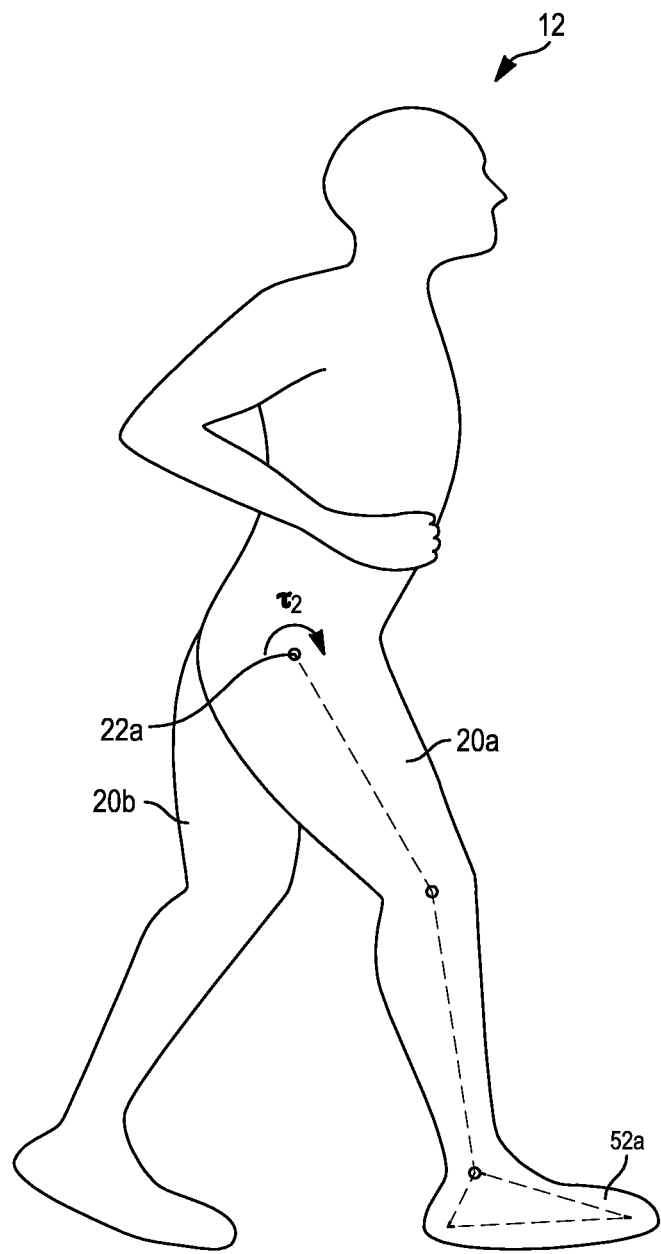

FIGS. 2a-2b show a schematic representation of a joint torque augmentation system for a hip joint. FIG. 2a shows joint torque augmentation system 10 provides a torque at right hip joint 22a as right leg 20a enters swing phase. Joint torque augmentation system 10 is positioned on user 12 to produce a torque $\tau_1$ at right hip joint 22a that is timed with the user's step. At the end of stance phase for the user's right leg 20a, both of the user's feet 52 are in contact with the ground. User 12 has completed the push off phase of gait with the right foot 52a, and the right foot 52a is about to lift from the ground. The right hip is extended and user 12 begins to flex the right hip to swing right leg 20a forward. As user 12 flexes the right hip and enters swing phase, control assembly 34 commands actuator 36 to follow a command path or position. The position of actuator 36 results in a force or torque applied to right leg 20a and right hip joint 22a. The result of the force or torque applied by joint torque augmentation system 10 is a torque $\tau_1$ acting at right hip joint 22a. Torque $\tau_1$ is applied to user 12 in the sagittal plane in the direction of the arrow shown in FIG. 2a and assists user 12 with hip flexion. A second joint torque augmentation system 10 is worn on left leg 20b to provide a torque, similar to torque $\tau_1$, acting on left hip joint 22b during swing phase of left leg 20b.

FIG. 2b shows joint torque augmentation system 10 that provides a torque at right hip joint 22a for right leg 20a entering stance phase. In one embodiment, joint torque augmentation system 10 provides an assistive force or torque during stance phase. At the end of swing phase for the user's right leg 20a, right foot 52a makes contact with the ground at heel strike. The right hip is flexed and user begins to extend the right hip, pushing torso 18 forward over right leg 20a. As user 12 extends the right hip and moves through stance phase, control assembly 34 commands actuator 36 to follow a command path or position. The position of actuator 36 results in a force or torque applied to right leg 20a and right hip joint 22a. The result of the force or torque applied by joint torque augmentation system 10 is a torque $\tau_2$ acting at right hip joint 22a. Torque $\tau_2$ is applied to user 12 in the sagittal plane in the direction of the arrow shown in FIG. 2b and assists user 12 with hip extension. A second joint torque augmentation system 10 is worn on left leg 20b to provide a torque, similar to torque $\tau_2$, acting on left hip joint 22b during stance phase of left leg 20b. In another embodiment, joint torque augmentation system 10 provides an assistive force or torque during stance phase and swing phase. By providing torque $\tau_1$, torque $\tau_2$, or both torque $\tau_1$ and torque $\tau_2$ at proper timing, joint torque augmentation system 10 enhances human motion and reduces the metabolic cost of gait.

Figure 3:
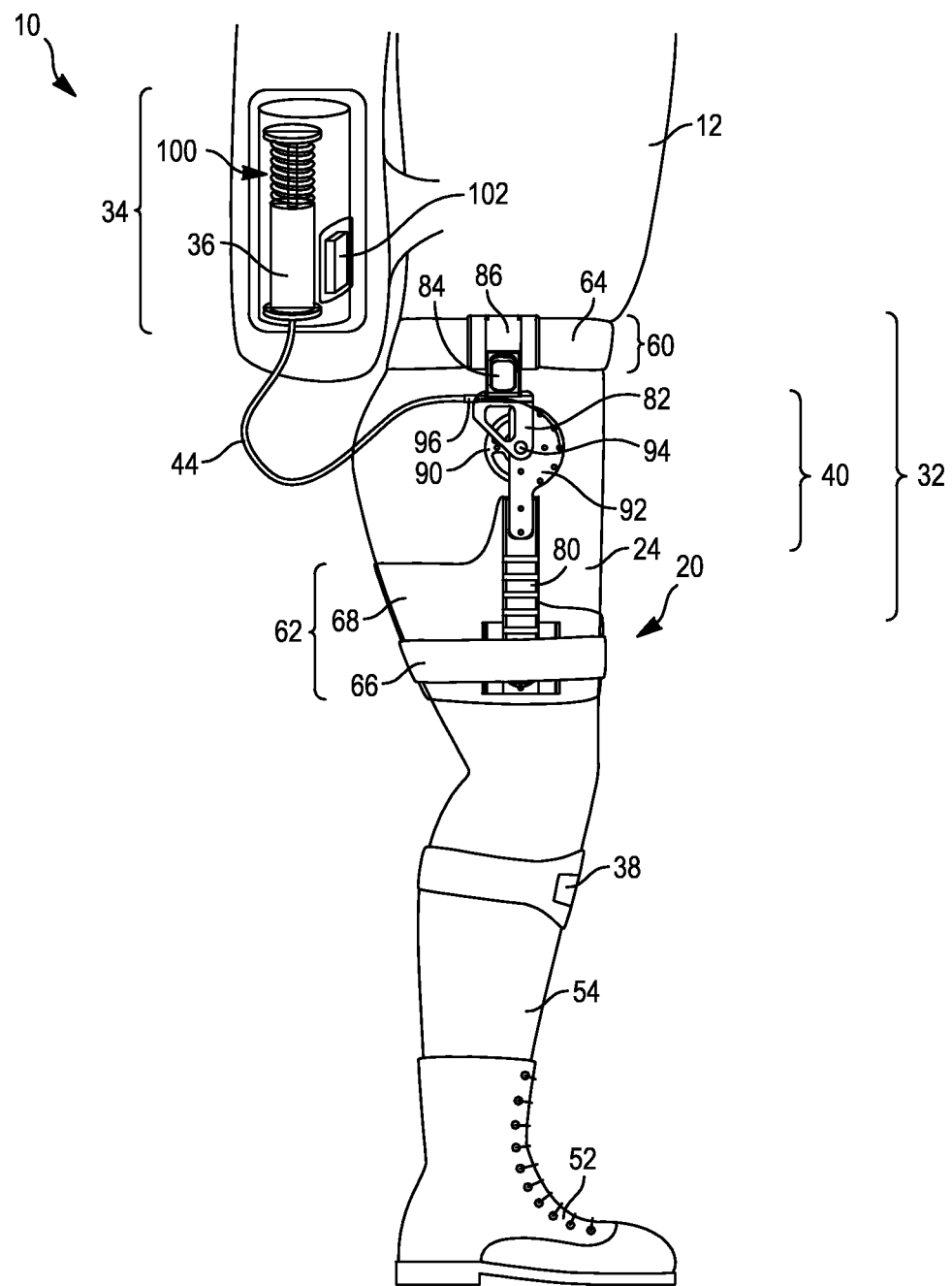
FIG. 3 illustrates a side view of joint torque augmentation system in more detail.

In FIG. 3, a side view of joint torque augmentation system 10 from FIG. 1 is shown in more detail. Joint torque augmentation system 10 includes attachment assembly 30, linkage assembly 32, and control assembly 34. Attachment assembly 30 couples linkage assembly 32 to user 12. Control assembly 34 applies a force or torque to user 12 through linkage assembly 32. Linkage assembly 32 transfers a force from control assembly 34 into a torque or force directed at a limb or joint of user 12.

Attachment assembly 30 includes a torso attachment 60 and a thigh attachment 62. In one embodiment, torso attachment 60 includes a reinforced hip belt 64. Reinforced hip belt 64 includes a material that is flexible enough to wrap into belt, yet rigid enough to withstand torsional force. Reinforced hip belt 64 is worn on torso 18 of user 12. The hooped shape of reinforced hip belt 64 around the user's torso increases the resistance of the belt to deformation under torsional forces. Reinforced hip belt 64 is configured to efficiently transfer reaction torques from linkage assembly 32 to user 12. Reinforced hip belt 64 is adjustable for different torso sizes.

Thigh attachment 62 comprises an assembly that couples linkage assembly 32 to leg 20. In one embodiment, thigh attachment 62 includes a thigh strap 66 and thigh support panel 68. Thigh support panel 68 provides a large surface area of material worn around thigh 24, through which the forces from joint torque augmentation system 10 are applied to thigh 24 of leg 20. In another embodiment, thigh attachment 62 is incorporated into clothing or other wearable items. In yet another embodiment, joint torque augmentation system 10 is coupled to an exoskeleton, frame, or body armor, which is coupled to user 12 or worn by user 12.

Linkage assembly 32 includes a pulley system 40. Pulley system 40 includes pulley carriage 42, cable 44, and support links 46. Supporting links 46 of pulley system 40 include a thigh link 80, pulley cable support 82, hip adjustment link 84, and hip belt attachment 86. Pulley carriage 42 of pulley system 40 further includes an inner pulley 90 and an outer pulley 92 aligned with a center axis of rotation located at system joint 94. Pulley cable support 82 couples to outer pulley 92 and rotates around outer pulley 92 at system joint 94. System joint 94 aligns closely with hip joint 22 of user 12 to ensure the application of torque from joint torque augmentation system 10 is optimized.

Cable 44 couples to pulley system 40 at pulley cable support 82 and at inner pulley 90 and outer pulley 92. In one embodiment, cable 44 is a tension cable surrounded by a compressive sheathing, for example, a Bowden cable. A Bowden cable includes a tension cable to provide a pulling force and a compressive sleeve to carry the equal and opposite reaction loads from the cable. The tension in cable 44 is carried through the neutral axis of the compression sleeve. Cable 44 bends and moves with movement of user 12, while the relative location of the ends of cable 44 are independent from ability of actuator 36 to produce tension in cable 44. In another embodiment, cable 44 includes multiple cable portions coupled together in series. Cable 44 couples to pulley cable support 82 by fastener 96. In one embodiment, fastener 96 includes a quick disconnect to allow cable 44 to disconnect from pulley system 40 for easy donning and doffing of joint torque augmentation system 10. Fastener 96 positions cable 44 on pulley carriage 42 such that cable 44 is directed around inner pulley 90. In one embodiment, fastener 96 includes a tension adjustment. Fastener 96 operates as a screw adjustment that is manually turned to adjust the tension of cable 44. Fastener 96 operates as fine tensioning for cable 44. Cable 44 is further disposed around inner pulley 90 and within outer pulley 92. A first end of cable 44 couples to outer pulley 92. In one embodiment, cable 44 couples to outer pulley 92 by a quick disconnect fastener.

Pulley system 40 is coupled to thigh link 80 by outer pulley 92. Thigh link 80 operates as the primary link for transferring torque from pulley system 40 to the user's thigh 24. A thigh link 80 is coupled to thigh attachment 62 of attachment assembly 30. Thigh link 80 is rigid with respect to the sagittal plane, but is flexible in the coronal or frontal plane to allow abduction and adduction movements of leg 20. In one embodiment, thigh link 80 couples between rigid members of thigh support panel 68. Therefore, outer pulley 92 is rigidly coupled to thigh link 80, and thigh link 80 is rigidly coupled to thigh support panel 68. As pulley system 40 creates torque around system joint 94, outer pulley 92 forces thigh link 80 into rotation in the direction of hip flexion, or in the counterclockwise direction in the view shown in FIG. 3. Thigh link 80, together with thigh attachments 62 including thigh support panel 68 and thigh strap 66, transfers force or torque to thigh 24 to assist leg 20 in hip flexion.

Pulley cable support 82 of pulley system 40 is coupled to hip belt attachment 86 by hip adjustment link 84. Hip adjustment link 84 is pivotally coupled to pulley cable support 82 and to hip belt attachment 86 to allow adjustment in the coronal plane. Hip belt attachment 86 is adjustable and can slide along reinforced hip belt 64 for positioning and adjustment of linkage assembly 32 in the sagittal plane. Hip belt attachment 86 is rigidly affixed to reinforced hip belt 64 during use of joint torque augmentation system 10. The position of hip belt attachment 86 is selected to align system joint 94 with hip joint 22 of user 12. Reinforced hip belt 64, hip belt attachment 86, and hip adjustment link 84 are configured to resist torque in the sagittal plane, which ensures torque produced by joint torque augmentation system 10 is efficiently transferred to hip joint 22. Therefore, linkage assembly 32 includes a combination of rigid, compliant, or unidirectional links that transmit a force from control assembly 34 to hip joint 22.

Control assembly 34 is coupled to pulley cable support 82 of linkage assembly 32 through cable 44. Control assembly 34 is coupled to user 12. Control assembly 34 can be mounted remotely with respect to the location of linkage assembly 32. In one embodiment, control assembly 34 is carried in backpack 16 or coupled externally to user 12. By coupling control assembly 34 to the torso 18 of user 12, rather than to legs 20, the weight of control assembly 34 is positioned for better gait dynamics than if control assembly was mounted to legs 20. Additional weight on the legs is avoided and joint torque augmentation system 10 performs better by further reducing metabolic cost and is more comfortable for user 12 to wear. Alternatively, control assembly 34 is mounted on a leg 20 of user 12 or at any point of attachment on user 12. In another embodiment, control assembly 34 is coupled to an exoskeleton, frame, or body armor, which is coupled to user 12 or worn by user 12.

Control assembly 34 includes an actuator 36 that applies a tension force to cable 44 and to move outer pulley 92 and thigh link 80. In one embodiment, control assembly 34 includes a compliant actuator system. The compliant actuator system of control assembly 34 generally includes a compliant element 100 and an actuator 36 disposed, for example, in series. Additionally, control assembly 34 includes a controller 102 comprising a microprocessor and a motor control board for controlling actuator 36. Controller 102 controls a position of actuator 36 based on information from sensor 38.

A sensor 38 is coupled to user 12 to continuously measure a user's movement or inertial information about user 12. Sensor 38 is coupled to user 12 and may be attached to a user's torso 18, ankle 50, leg 20, foot 52, or another part of user 12. In one embodiment, user 12 wears a joint torque augmentation system 10 on each leg, and a sensor 38 is worn on each tibia 54. To determine information about the movement of user 12, sensor 38 measures a physical state, such as a kinematic state, loading state, or a kinematic and loading state, of user 12. Sensor 38 includes an accelerometer, vibrometer, rate gyro, potentiometer, inclinometer, potentiometer, pressure transducer, force transducer or load cell, or other sensor. The measurement from sensor 38 may be linear position, linear velocity, linear acceleration, angular position, rotational or angular velocity, rotational or angular acceleration, or other measurement.

Sensor 38 is coupled to controller 102 wirelessly or by wired connection. Controller 102 receives and processes the continuous measurements from sensor 38. In one embodiment, controller 102 uses the measurements from sensor 38 to determine the phase of a gait cycle for user 12. Control assembly 34 interprets the continuous measurements from sensor 38 and commands a path for actuator 36 to move linkage assembly 32 to match the user's gait. Control assembly 34 selects a path for actuator 36 according to the inertia or expected movement of user 12 by comparing the continuous measurements from sensor 38 to able-bodied data. Actuator 36 includes any suitable system that applies a force to compliant element 100 to pull on cable 44. For example, actuator 36 includes a linear actuator, pneumatic cylinder, hydraulic actuator, electromagnetic actuator, or another type of motor. In one embodiment, actuator 36 acts on cable 44 by deflecting compliant element 100, which pulls on cable 44. Compliant element 100 is coupled to cable 44 such that the deflection of compliant element 100 produces a tension force on cable 44. Compliant element 100 operates to reduce the impact from error in the timing of actuation by absorbing force such that user 12 feels a more natural force, rather than jolting force, from joint torque augmentation system 10. Cable 44 transmits the force from actuator 36 of control assembly 34 to linkage assembly 32. Linkage assembly 32 transmits the force produced by control assembly 34 to user 12. Thus, control assembly 34 acts on linkage assembly 32 to assist leg 20 into hip flexion during swing phase of the user's gait.

Control system 34 pulling on cable 44 produces a unidirectional torque on user 12. Joint torque augmentation system 10 produces an assistive torque in a first direction, while cable 44 is in tension. Joint torque augmentation system 10 allows unencumbered movement in a second direction opposite the first direction, while cable 44 is slack. By nature of the cable-based linkage, joint torque augmentation system 10 provides unidirectional joint torque augmentation. Joint torque augmentation system 10 adds torque to hip joint 22 of user 12 to aid in the task of gait. The augmentation of hip joint torque assists user 12 with carrying a heavy load or enhances the overall strength of user 12 during gait. In another embodiment, joint torque augmentation system 10 is configured to provide bidirectional or multi-direction force or torque using a plurality of linking members.

Figure 4:
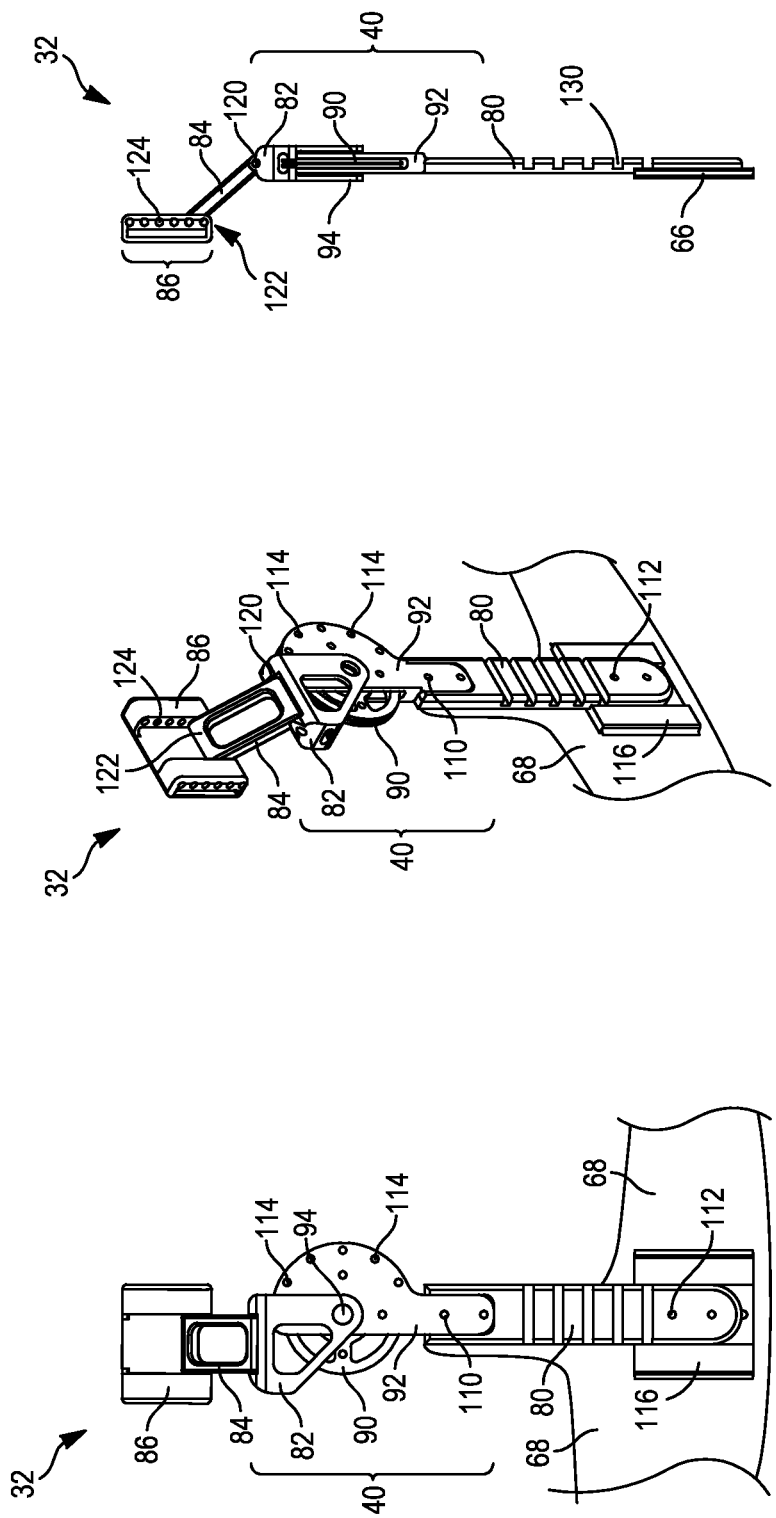
FIGS. 4a-4c illustrate a linkage assembly of a joint torque augmentation system for the hip joint.

FIGS. 4a-4c show linkage assembly 32 of joint torque augmentation system 10 for the hip joint. FIG. 4a shows a side view of a linkage assembly 32 for joint torque augmentation system 10. Linkage assembly 32 includes hip belt attachment 86, hip adjustment link 84, thigh link 80, and pulley system 40. Each component of linkage assembly 32 may comprise a suitably rigid or flexible material. Linkage assembly 32 components may include a plastic or polymer material such as acrylonitrile butadiene styrene (ABS), polycarbonate (PC), polylactic acid (PLA), polyamide, nylon, acrylic, polyethylene terephthalate (PET), polypropylene (PP), polyurethane (PU), polyethylene (PE), ultra high molecular weight (UHMW) PE, polyimide, polytetrafluoroethylene (PTFE), polyvinyl fluoride (PVF), polyvinyl alcohol (PVA), polyvinyl chloride (PVC), polystyrene, or other suitable material. Linkage assembly 32 components may also include metal, metal alloy, polymer, fiberglass, carbon fiber, composite, or a natural material.

Pulley system 40 includes pulley cable support 82, inner pulley 90, and outer pulley 92. Pulley system 40 couples to thigh link 80 through a rigid portion extending from outer pulley 92. Thigh link 80 couples to outer pulley 92 at a joint or plurality of joints 110. In one embodiment, joint 110 is adjustable to accommodate different users. In another embodiment, thigh link 80 is an extension of outer pulley 92. Pulley system 40 and thigh link 80 may comprise any configuration of rigid or flexible links or joints that transfers force or torque to a user's limb.

Thigh link 80 terminates at a joint 112 on thigh support panel 68. Joints 110 and 112 comprise a primary interface between linkage assembly 32 and attachment assembly 30, where force or torque is transmitted to user 12. In one embodiment, joint 112 is adjustable to accommodate different users. In another embodiment, joint 112 is a prismatic joint or slip joint that absorbs vertical translation of thigh link 80 and corrects for misalignment of system joint 94 to hip joint 22. As a slip joint, joint 112 reduces wear and abrasion on user 12 and further reduces error in joint torque augmentation system 10. Joint 112 allows joint torque augmentation system 10 to transfer torque to user's hip joint 22 efficiently.

Pulley system 40 includes pulley cable support 82, inner pulley 90, and outer pulley 92. A cable 44 from FIG. 3 couples to outer pulley 92 at one or more openings or attachment points 114. In one embodiment, a quick disconnect pin is used to couple cable 44 to attachment points 114. Attachment points 114 allow for course tensioning of cable 44. Cable 44 is coupled to an attachment point 114 that provides the optimal tension in cable 44 for user 12. Thus, pulley system 40 is easily adjustable by user 12.

As actuator 36 from FIG. 3 engages to pull on cable 44, cable 44 exerts a force on outer pulley 92 at attachment point 114 to produce a torque around system joint 94. Outer pulley 92 rotates with respect to inner pulley 90 and with respect to pulley cable support 82 in the counterclockwise direction in the view shown in FIG. 4a. Thigh link 80 being rigidly connected to outer pulley 92 is pulled in the direction of hip flexion. In one embodiment, thigh support panel 68 includes linking members 116, which further secure thigh link 80. Thigh link 80 couples between a plurality of linking members 116 disposed on thigh support panel 68. The force or torque on thigh link 80 from outer pulley 92 is transferred to thigh support panel 68. Thigh support panel 68 distributes the force over the surface area of thigh support panel 68, which is in contact with the user's thigh 24. The force directed at the user's thigh 24 assists with hip flexion. Accordingly, joint torque augmentation system 10 operates through linkage assembly 32 to provide hip joint torque augmentation in the sagittal plane.

FIG. 4b shows an isometric view of linkage assembly 32 of joint torque augmentation system 10. Hip adjustment link 84 is pivotally coupled to pulley cable support 82 at joint 120 and is pivotally coupled to hip belt attachment 86 at joint 122. Hip adjustment link 84 couples to openings or attachment points 124 on hip belt attachment 86. The interface of hip adjustment link 84 and hip belt attachment 86 is adjustable at attachment points 124. Attachment points 124 include a plurality of selectable openings to which hip adjustment link 84 couples in order to select the height or position of hip adjustment link 84.

FIG. 4c shows a front view of linkage assembly 32 of joint torque augmentation system 10. Pulley system 40 and thigh link 80 are shown with joint 120 positioned laterally with respect to hip belt attachment 86. Joints 120 and 122 may include revolute joints, prismatic joints, screw-type joints, or other joint types. In one embodiment, joints 120 and 122 are revolute joints that allow hip adjustment link 84 to pivot or rotate with respect to hip belt attachment 86 and pulley cable support 82 of pulley system 40. Joints 120 and 122 allow linkage assembly 32 to accommodate hip adduction and abduction. As user 12 moves leg 20 laterally, in the direction of abduction, thigh link 80 rotates and joint 120 moves laterally in the coronal plane. Hip adjustment link 84 rotates and pivots at joints 120 and 122 during hip abduction. As user 12 moves leg 20 medially, in the direction of adduction, thigh link 80 rotates and joint 120 moves medially in the coronal plane. Joint 120 moves medially while hip adjustment link 84 rotates and pivots at joints 120 and 122 during hip adduction.

Thigh link 80 further includes groves or notches 130 formed partially though the surface of thigh link 80. Grooves 130 permit additional flexion of thigh link 80 in the coronal plane to allow for better contour along the natural curvature of the user's thigh. Grooves 130 are oriented horizontally with respect to the length of thigh link 80. Grooves 130 do not reduce the strength of thigh link 80 in the sagittal plane. Thigh link 80 withstands torque in the sagittal plane, while being flexible in the coronal plane. Therefore, as the force from pulley system 40 is transferred through outer pulley 92 into thigh link 80, thigh link 80 remains substantially rigid.

Figure 5:
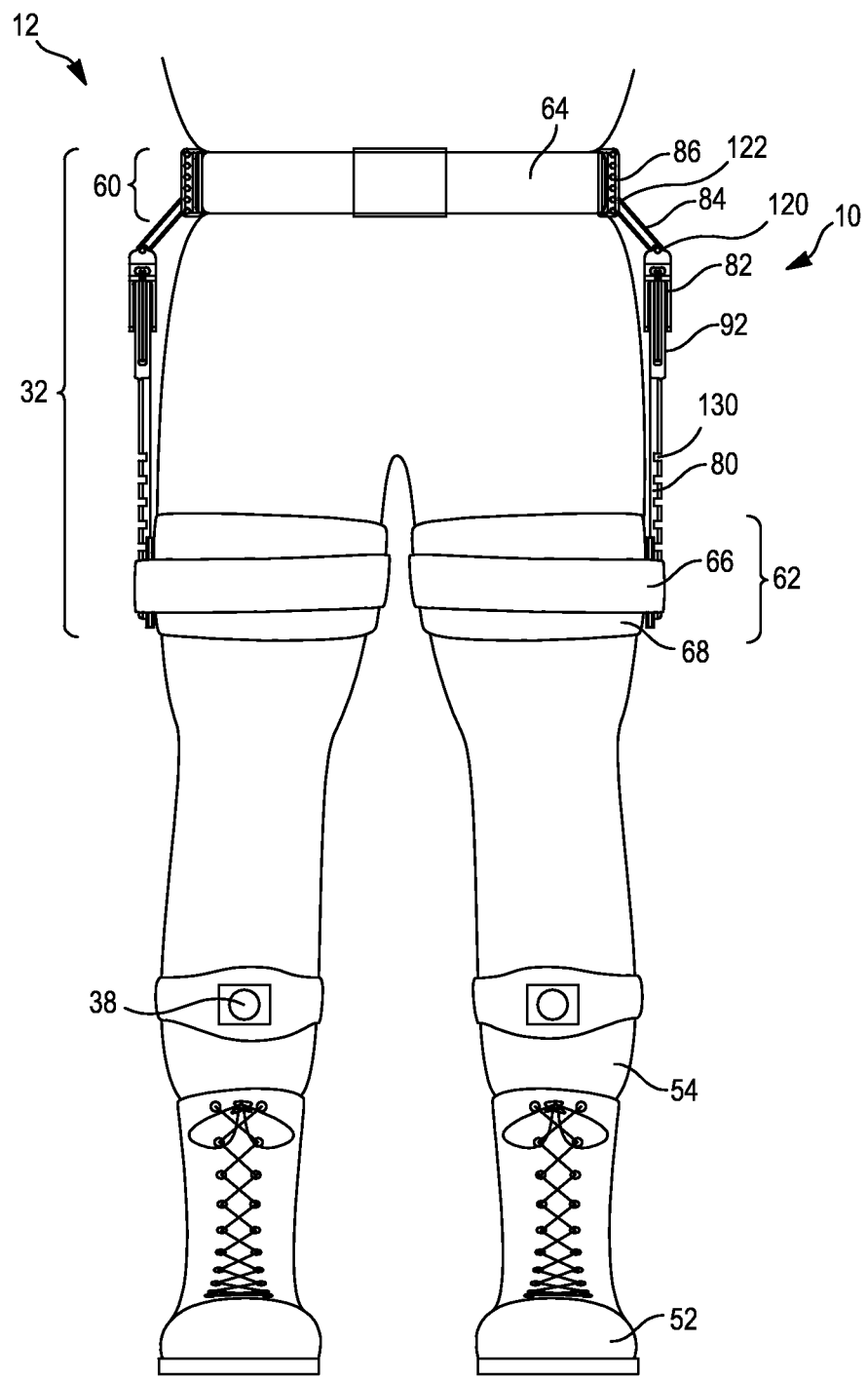
FIG. 5 illustrates a front view of joint torque augmentation system worn at a user's hips.

FIG. 5 shows a front view of joint torque augmentation system worn at a user's hips. Linkage assembly 32 provides two degrees of freedom at hip joint 22 of user 12. Linkage assembly 32 allows for hip extension and flexion in the sagittal plane. Linkage assembly 32 further allows for hip adduction and abduction in the coronal plane. Hip adjustment link 84 allows adduction and abduction of the leg, by pivoting at joints 120 and 122 as the leg moves in the coronal plane. Hip adjustment link 84 pivots at joints 120 and 122 to fit user 12 by contouring linkage assembly 32 around the hips and legs of user 12. Grooves 130 provide additional flexibility of linkage assembly 32, to ensure full range of motion for hip adduction and abduction. User 12 is permitted a substantially unencumbered range of motion in the sagittal and coronal planes while wearing joint torque augmentation system 10.

Figure 6A:
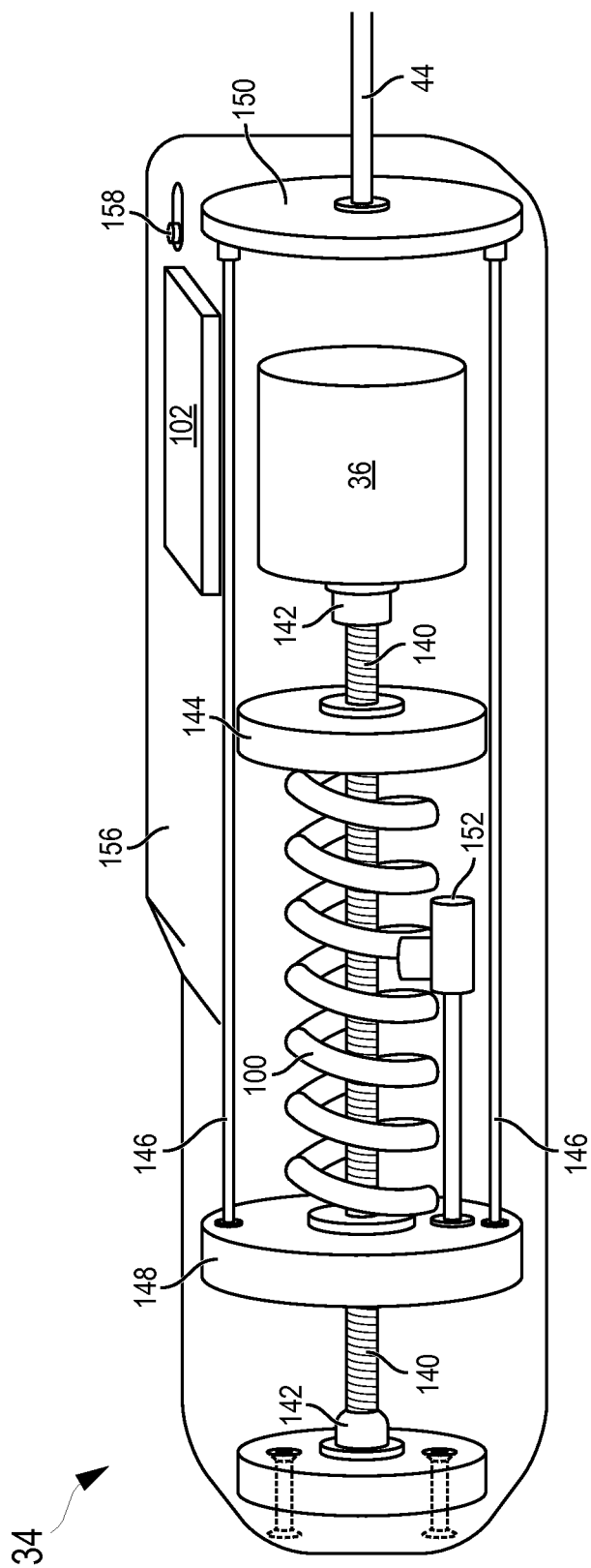
FIGS. 6a-6c illustrates further detail of the control system for the joint torque augmentation system.
Figure 6B:
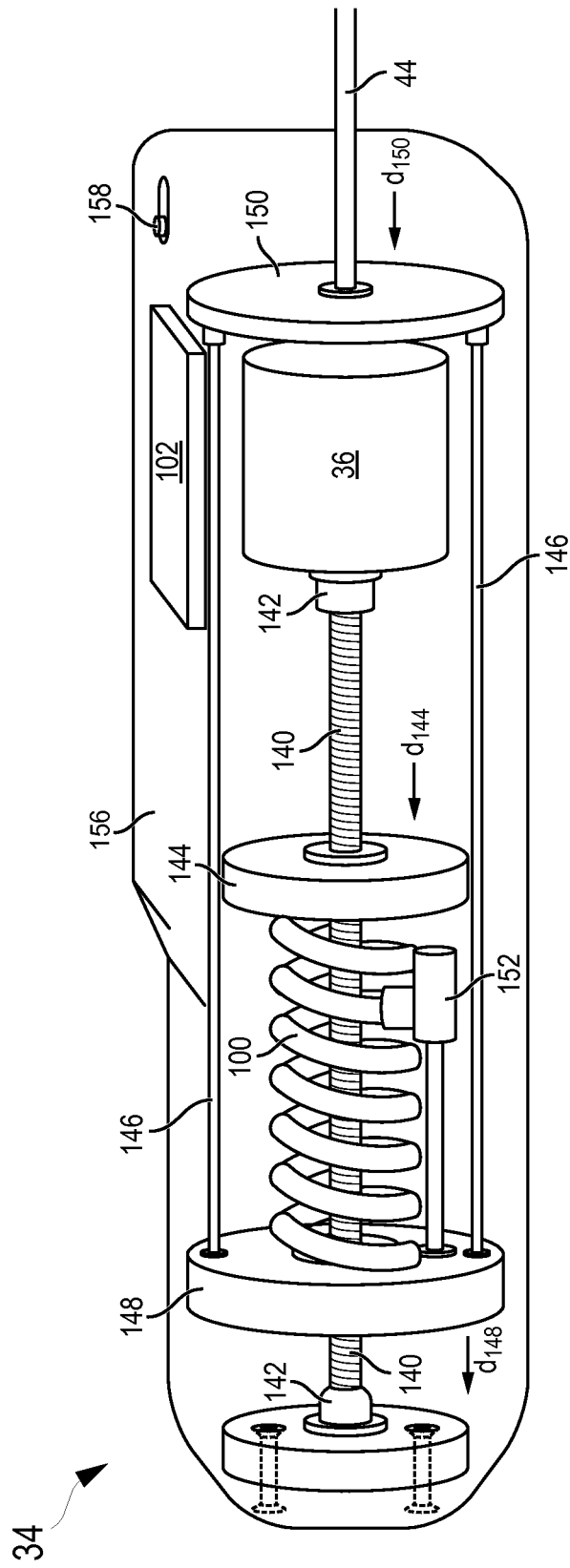
Figure 6C:
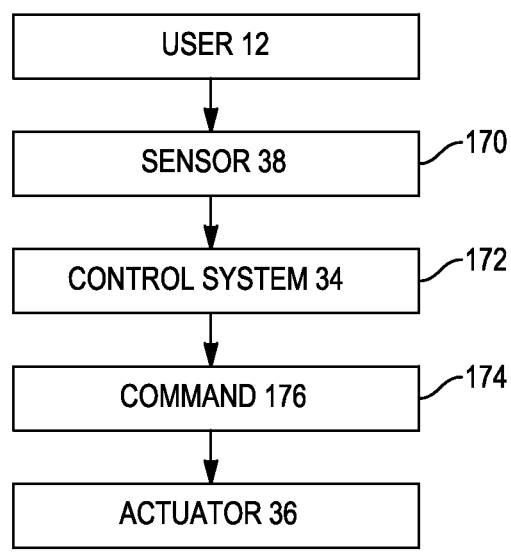

FIGS. 6a-6c show further detail of control assembly 34 for the joint torque augmentation system. FIG. 6a shows an example of control assembly 34 with actuator 36 and compliant element 100 in a first actuation position. Control assembly 34 includes actuator 36, compliant element 100, and controller 102. Controller 102 is coupled to actuator 36 and operates as a motor controller for actuator 36. Actuator 36 may comprise an electric motor and lead screw, hydraulic, pneumatic, rotary, direct-drive, series-elastic, electroactive polymer-based, chemical-based, or other actuation scheme. In one embodiment, actuator 36 includes a 120 Watt (W) roller screw drive motor and produces over 1,300 Newtons (N) of force. Actuator 36 couples to a screw 140 to rotate or drive screw 140 and produce rotary motion. Screw 140 includes bearings 142, such as radial bearings and thrust bearings, at each end of screw 140. Actuator 36 couples to screw 140 at one end of screw 140 to drive screw 140 in either the clockwise direction or counterclockwise direction based on the command or motor control pattern received by actuator 36 from controller 102.

Rotary power produced by actuator 36 is converted to linear power through the interface between screw 140 and a nut 144. Screw 140 includes threading, and nut 144 is coupled to screw 140. As actuator 36 drives the rotation of screw 140, nut 144 translates linearly along the length of screw 140. Nut 144 and screw 140 are configured to be non-backdrivable, such that external forces on nut 144 will not cause nut 144 to translate along screw 140. Actuator 36 is coupled to compliant element 100 through nut 144. In one embodiment, compliant element 100 includes a helical or coil spring. Nut 144 interfaces with compliant element 100 when nut 144 contacts compliant element 100 and produces a deflection in compliant element 100. The rotary power of actuator 36 causes translational movement of nut 144, which causes deflection in compliant element 100 as nut 144 translates along the length of screw 140 and produces a compressive force on compliant element 100. Therefore, control assembly 34 converts rotary motion of actuator 36 into linear motion and deflection of compliant element 100.

Compliant element 100 includes a tuned spring having a stiffness optimized for efficient use of power from actuator 36. A spring constant or stiffness of compliant element 100 is selected according to the minimum peak power necessary from actuator 36 to produce the desired force in cable 44 for joint torque augmentation. A force produced by actuator 36 acting on compliant element 100 is transferred to cable 44 through a plurality of connecting cables 146. Compliant element 100 is coupled to connecting cables 146 through a yolk 148. Connecting cables 146 couple to cable 44 through a cable link 150. Cable 44 is connected to cable link 150 by a quick disconnect link for ease of detaching control assembly 34 from cable 44.

Controller 102 includes a microprocessor and a motor control board for controlling actuator 36, which drives joint torque augmentation system 10. In one embodiment, the motor control board handles 540 W continuous and 1.5 kilowatt (kW) peaks. Controller 102 is selected to produce over 100,000 gait cycles. Control assembly 34 further includes an optional encoder or sensor 152 for measuring deflection of compliant element 100 in order to determine the force in cable 44.

Control assembly 34 is disposed within housing 156. Housing 156 includes an impact resistant material for mounting control assembly 34 within housing 156. Housing 156 may include a plastic or polymer, such as ABS, PC, PLA, polyamide, nylon, acrylic, PET, PP, PU, PE, UHMW PE, polyimide, PTFE, PVF, PVA, PVC, polystyrene, or other suitable material. In one embodiment, housing 156 is approximately 23 centimeters (cm) in length. Housing 156 protects the electrical and mechanical components of control assembly 34 from damage due to impact. Control assembly 34 further includes an interface button 158 for turning control assembly 34 on and off.

FIG. 6b shows an example of control assembly 34 with actuator 36 and compliant element 100 in a second actuation position. Controller 102 of control assembly 34 is coupled to sensor 38, receives data from sensor 38, and produces a command for actuator 36. When controller 102 determines that user 12 is entering a phase of the gait cycle where joint torque augmentation is desired, controller 102 commands a path for actuator 36 to follow. The command path for actuator 36 positions nut 144 to produce a controlled tension on cable 44. Actuator 36 rotates screw 140 to drive nut 144 in a direction $d_{144}$. Nut 144 exerts a force on compliant element 100 causing compression of compliant element 100. The force on compliant element 100 causes a force on yolk 148 in a direction $d_{148}$. The force on yolk 148 produces tension in connecting cables 146, which pulls cable link 150 a direction $d_{150}$. Cable link 150 pulls on cable 44 producing a tension force in cable 44. Cable 44 produces a force on linkage assembly 32 that is transferred to the user's joint through attachment assembly 30. Compliant element 100 operates to reduce the power required from actuator 36 and also absorbs error in timing of actuator 36.

Sensor 152 is coupled to compliant element 100, mounted to housing 156, or coupled in proximity to compliant element 100. Sensor 152 includes a potentiometer, pressure transducer, force transducer or load cell or other sensor. In one embodiment, sensor 152 is a potentiometer configured to measure a deflection of compliant element 100. As user 12 moves through a gait cycle, the force on compliant element 100 is calculated from the measured spring deflection. The force experienced by compliant element 100 correlates to the speed user 12 is moving and to the moment experienced at the joint. The measured force on compliant element 100 is used by controller 102 as additional feedback used to determine the next command for actuator 36. In one embodiment, controller 102 uses information from both sensor 38 and sensor 152 to produce a command for actuator 36. In another embodiment, sensor 152 is optional and controller 102 uses information from sensor 38 to produce a command for actuator 36. In yet another embodiment, sensor 38 is optional and controller 102 uses information from sensor 152 to produce a command for actuator 36. Additionally, where actuator 36 is inactive, slack is driven into cable 44 to allow user 12 an unrestricted range of motion. Where user 12 moves faster than the speed of actuator 36, cable 44 produces slack and does not encumber the user's motion.

FIG. 6c shows a method of controlling a joint torque augmentation system 10. The method for controlling joint system 10 using control system 34 includes the step of sensing 170 a physical state or movement of user 12 or inertial information about user 12. The step of sensing 170 may further include sensing information about the state or position of actuator 36. The method for controlling joint system 10 using control system 34 includes the steps of processing 172 the information from the sensor or sensors using control system 34, and generating 174 a command 176 for actuator 36. During the step of sensing 170, sensor 38 continuously measure a user's movement or inertial information about user 12. In one embodiment, sensor 38 detects a kinematic state, a loading state, or a kinematic state and a loading state. Additional sensors, such as sensor 152, are disposed within control system 34 to continuously measure a state of actuator 36, compliant element 100, or other component of control system 34. Sensor 152 detects a state of control system 34, such as a force on compliant element 100 or position of actuator 36, to determine a moment on the user's joint. The measurements from sensors 38 and 152 are processed by control system 34.

During the step of processing 172 the signals from sensor 38, sensor 152, or both sensors 38 and 152, control system 34 determines information about the user's gait. The continuous measurements from sensors 38 and 152 are filtered and conditioned to obtain the user's speed, stride length, or percent of gait cycle. Other gait information may include current joint torque, joint angle, limb position, and magnitude of force or moment at a joint. The gait information is further processed to obtain a command 176 for actuator 36.

During the step of generating 174 a command 176, the processed measurements are input into a reference function derived from able-bodied data. Command 176 is produced to drive actuator 36 in the proper direction in order to control the tension in cable 44 to assist with one or more gait activities. Such activities include walking, running, traversing slopes or stairs, avoiding obstacles, and other similar activities. Command 176 includes a command path, which is a position of actuator 36, such as a linear ramp, continuous drive, simple pulses, non-linear path, or other positional path. In contrast to if-then logic controllers, control system 34 uses continuous measurements to continuously determine the user's movement and determine an actuator 36 position to match the user's expected upcoming movement. In one embodiment, the processed measurement is compared with a recording or a calculation of able-bodied gait to determine or predict a desired gait activity. Command 176 is an output of control system 34 used to control actuator 36. Command 176 controls a position of actuator 36 which drives either tension or slack into cable 44.

Figure 7:
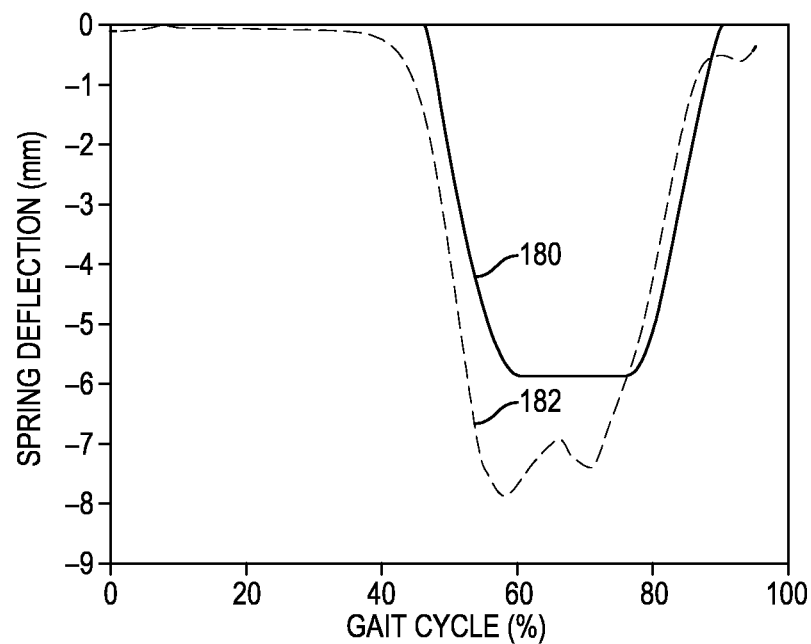
FIG. 7 illustrates a graph of the spring deflection of the compliant element of a joint torque augmentation system for a hip joint.

FIG. 7 illustrates a graph of the spring deflection of compliant element 100 of joint torque augmentation system 10 for hip joint 22. Line 180 represents the expected deflection of compliant element 100 in control system 34 during a gait cycle. Line 182 shows the deflection of compliant element 100 during testing. The deflection of compliant element 100 correlates to the torque at hip joint 22. Line 182 shows that user 12 drew more torque from joint torque augmentation system 10 than expected during testing. The peak torque delivered to hip joint 22 during the gait cycle was approximately 20 Nm. The average power required from actuator 36 during the gait cycle was 27 W. The peak power of actuator 36 during the gait cycle was 100 W. The joint torque augmentation system 10 has shown metabolic improvement of up to 15% during testing.

Figure 8:
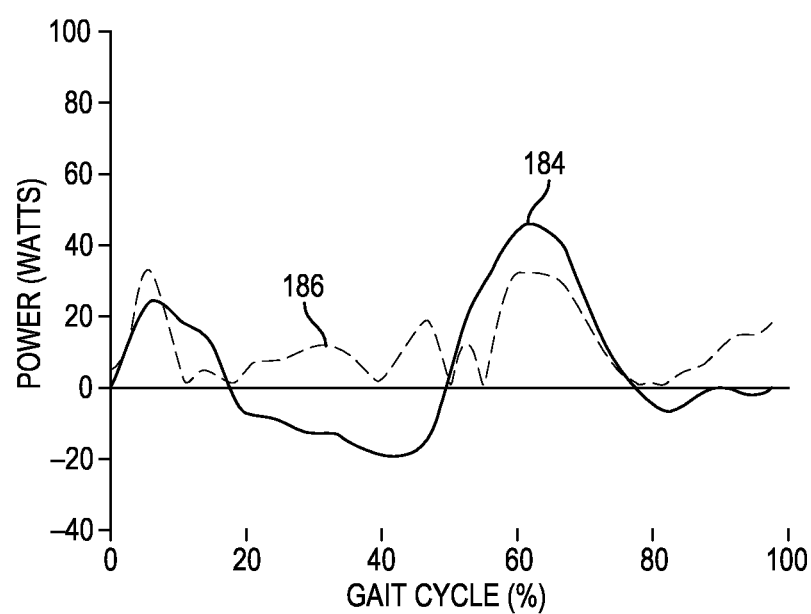
FIG. 8 illustrates a graph of the power provided by joint torque augmentation system during swing phase.

FIG. 8 illustrates a graph of the power provided by joint torque augmentation system during swing phase. Line 184 represents the power required at the hip joint to produce able-bodied gait while carrying a 45 kg load. For a control system without a compliant element 100, line 184 also represents the power required from actuator 36 to produce normal gait. The peak power required for normal gait at the hip is over 40 W. Line 186 represents the power required from actuator 36 of control system 34 for joint torque augmentation system 10, including compliant element 100, in order to produce normal gait. Compliant element 100 reduces the power required from actuator 36. The peak power requirement of actuator 36 is less than 40 W for joint torque augmentation system 10 to produce normal gait while carrying a 45 kg load.

Figure 9:
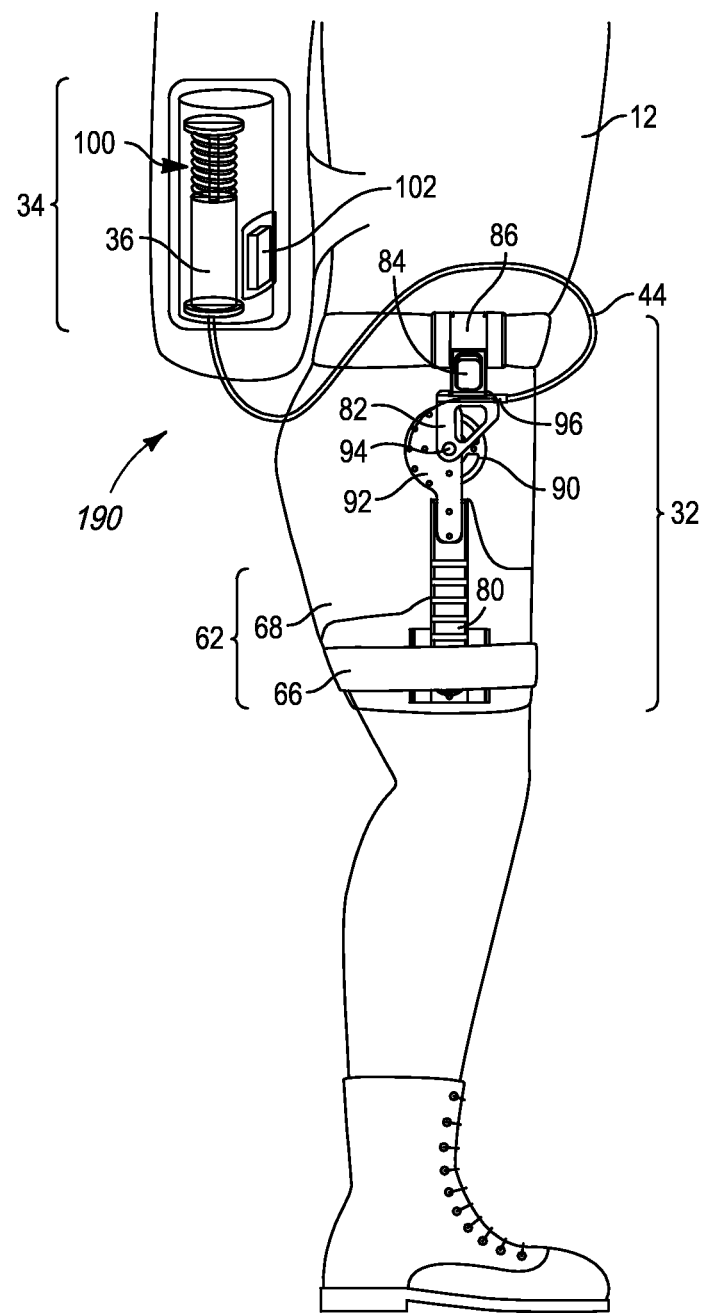
FIG. 9 illustrates a joint torque augmentation system for joint torque augmentation during stance phase.

FIG. 9 illustrates a joint torque augmentation system to assist with gait during stance phase. Joint torque augmentation system 190 is similar to joint torque augmentation system 10, but arranged to provide a torque to user 12 during stance phase rather than swing phase. As user 12 extends the right hip and moves through stance phase, control assembly 34 commands actuator 36 to follow a command path. The position of actuator 36 results in a force or torque applied to leg 20 and hip joint 22. The result of the force or torque applied by joint torque augmentation system 190 is a torque $\tau_2$ acting at hip joint 22. Torque $\tau_2$ is applied to user 12 in the sagittal plane in the direction of the arrow shown in FIG. 2b and assists user 12 with hip extension. In another embodiment, joint torque augmentation systems 10 and 190 are combined to provide an assistive force or torque during stance phase and swing phase.

Figure 10:
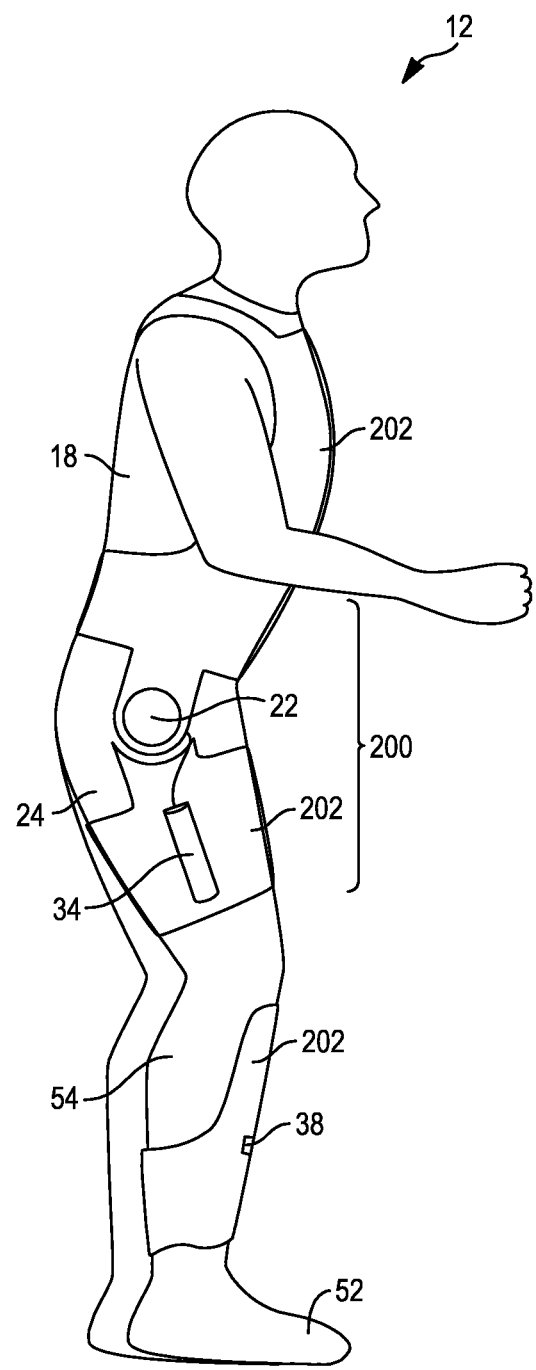
FIG. 10 illustrates an alternative joint torque augmentation system worn by a user.

FIG. 10 illustrates, in relation to FIGS. 1-9 and 11a-21d, an alternative attachment assembly for joint torque augmentation systems worn by a user. Joint torque augmentation system 200 may include any of the joint torque augmentation system described herein. Joint torque augmentation system 200 is coupled to body armor 202 worn by user 12. When user 12 wears body armor 202, weight is added to the legs. Added weight at the legs increases the metabolic cost of gait for user 12. By coupling joint torque augmentation system 200 to the existing structure of body armor 202, the size and weight of joint torque augmentation system 200, in particular the attachment and linkage assemblies, is reduced. Joint torque augmentation system 200 includes a system of rigid, compliant, or unidirectional links as described herein. One or more control assembly 34 is disposed on body armor 202 to produce the torque at the hip, the ankle, or both the hip and ankle. Joint torque augmentation system 200 produces torque at the joints of user 12 in order to offset the added weight of body armor 202 and reduce metabolic expenditure by user 12 during gait. Joint torque augmentation system 200 further provides full range of motion at the joints.

Figure 11A:
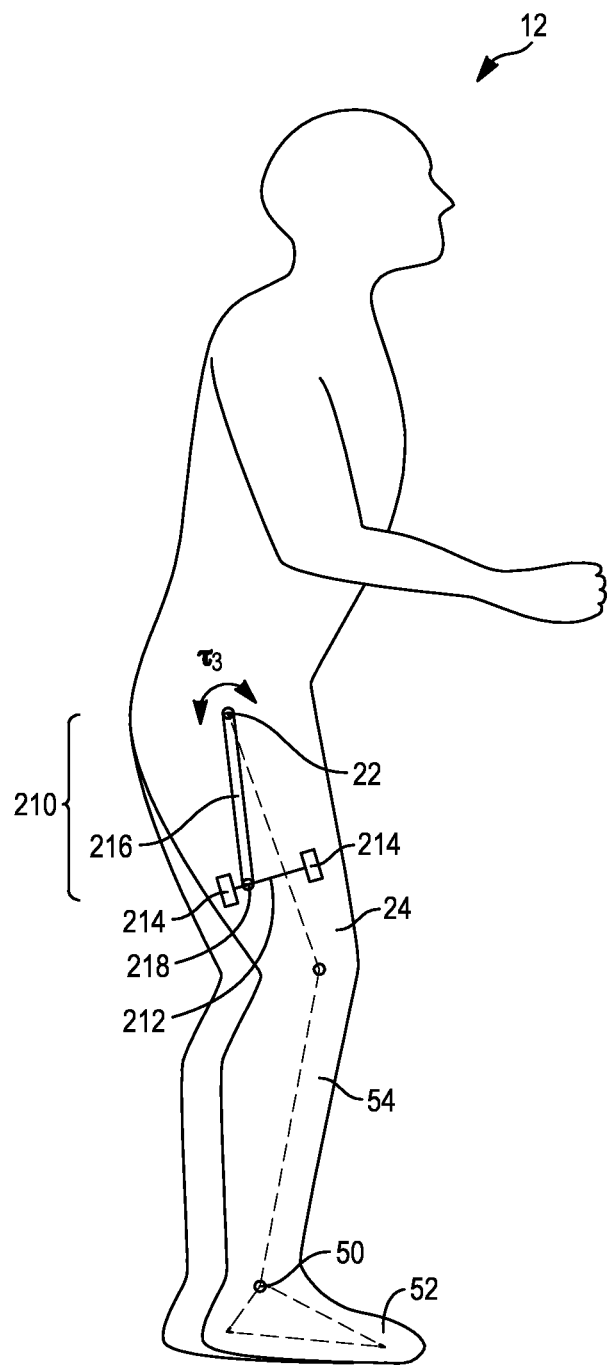
FIGS. 11a-11b illustrate a schematic representation of another joint torque augmentation system.
Figure 11B:
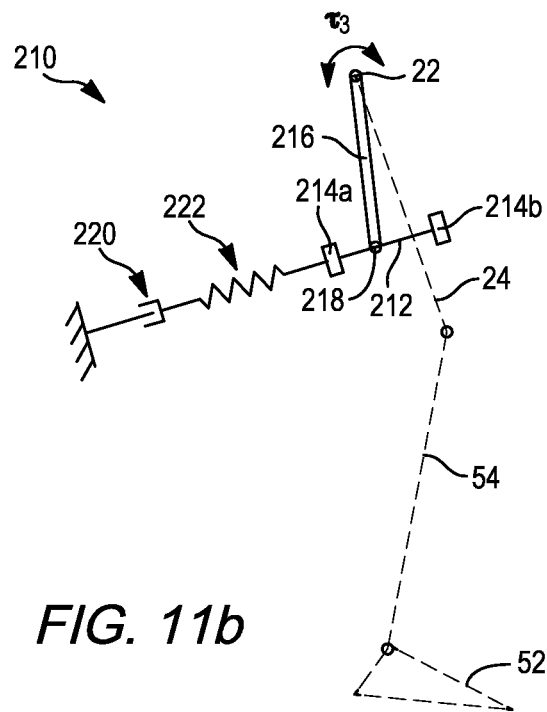

FIGS. 11a-11b illustrate a schematic representation of another joint torque augmentation system. FIG. 11a shows joint torque augmentation system 210 worn at the hip of user 12 to provide bidirectional torque at hip joint 22. Joint torque augmentation system 210 includes a system of rigid members controlled by an actuator. Rod or bar 212 is rigidly attached to user 12 through an attachment assembly, such as attachment assembly 30. Compliant members 214 are disposed at each end of bar 212. In one embodiment, compliant members 214 include bumpers or linear springs. Lever arm 216 is a rigid link coupled to bar 212 at joint 218. Joint 218 is a sliding joint. As lever arm 216 contacts compliant members 214, a torque $\tau_3$ is produced at ankle joint 22. Torque $\tau_3$ is bidirectional and alternates in direction to assist with gait through both stance phase and swing phase.

FIG. 11b shows a schematic representation of joint torque augmentation system 210 worn at the hip of user 12. Bar 212 is oscillated by an actuator 220 coupled to a first end of bar 212. A compliant member 222 is optionally coupled between bar 212 and actuator 220. As actuator 220 drives bar 212 forward, compliant member 214a contacts lever arm 216 and forces lever arm 216 to rotate and produce a torque $\tau_3$ in the direction of hip flexion. As actuator 220 drives bar 212 back, compliant member 214b contacts lever arm 216 and forces lever arm 216 to rotate and produce a torque $\tau_3$ in the direction of hip extension. Actuator 220 operates as a prismatic joint to facilitate the movement of bar 212. In another embodiment, compliant elements, such as compliant member 222, or damping elements, or a combination of compliant elements and damping elements are disposed on opposing sides of an actuator 220 or other prismatic joint. In yet another embodiment, neither compliant elements or damping elements are used, and actuator 220 operates as a direct drive system to oscillate bar 212. Therefore, joint torque augmentation system 210 produces joint torque during stance and swing phases of gait.

Figure 12:
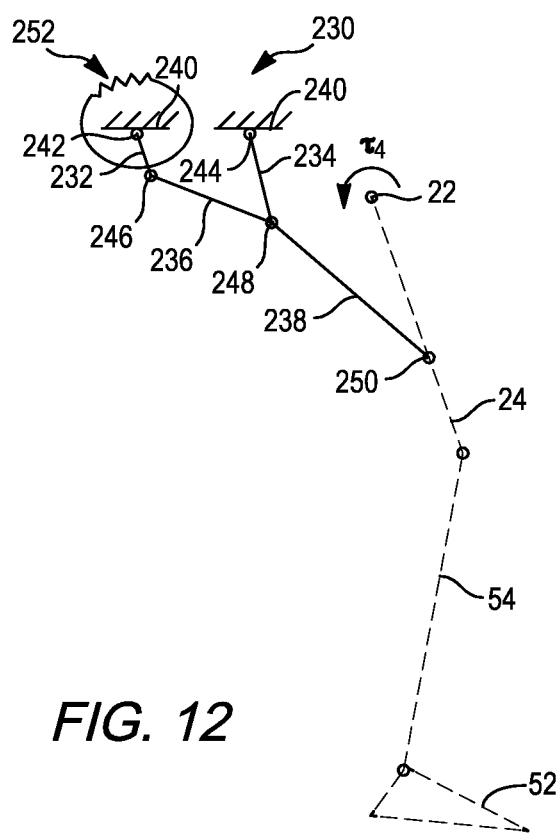
FIG. 12 illustrates a schematic representation of a passive joint torque augmentation system.

FIG. 12 illustrates a schematic representation of a passive joint torque augmentation system. Joint torque augmentation system 230 operates for an ankle joint. Joint torque augmentation system 230 operates as a wearable device for assisting user 12 with the movements associated with human gait.

Joint torque augmentation system 230 includes an assembly of links 232, 234, 236, and 238 and a torsional spring at each hip. Links 232, 234, 236, and 238 include rigid bars pivotally coupled together to form a four-bar mechanism for storing and releasing energy during gait. Links 232 and 234 couple to a fixed attachment assembly 240 at joints 242 and 244 respectively. Joints 242 and 244 may include revolute joints, prismatic joints, screw-type joints, or other joint types. In one embodiment, joints 242 and 244 are revolute joints permitting link 232 and 234 to rotate in the sagittal plane with respect to attachment assembly 240. An attachment assembly 240 is worn by user 12 at each hip. In one embodiment, joint torque augmentation system 230 is worn with backpack 16. In another embodiment, joint torque augmentation system 230 is incorporated into clothing or other wearable items. In yet another embodiment, joint torque augmentation system 230 is coupled to an exoskeleton, frame, or body armor, which is coupled to user 12 or worn by user 12. User 12 wears a joint torque augmentation system 230 in order to add assistive energy to the user's step and reduce the metabolic cost of gait.

Joint torque augmentation system 230 includes links 232 and 234 coupled together by link 236 at joints 246 and 248 respectively. Joints 246 and 248 may include revolute joints, prismatic joints, screw-type joints, or other joint types. In one embodiment, joints 246 and 248 are revolute joints permitting links 232 and 234 to rotate in the sagittal plane with respect to link 236. Link 238 couples to links 236 and 234 at joint 248. In one embodiment, link 238 rigidly couples to links 236 and 234. Link 238 couples to user 12 at an attachment point 250. Attachment point 250 represents the point at which joint torque augmentation system 230 applies a force to upper leg 24 in order to produce a torque $\tau_4$ at hip joint 22.

A compliant element or spring 252 is coupled to link 232 and attachment assembly 240 at joint 242. In one embodiment, spring 252 includes a torsional spring. As the user moves through stance phase and hip 22 extends, link 238 moves back with upper leg 24. Link 238 may be rigidly attached to link 234. Link 238 rotates back or in the posterior direction, causing links 236, 234, and 232 to rotate. As link 232 rotates, spring 252 twists and stores energy as user 12 moves through stance phase. As the user lifts foot 52 off of the ground for swing phase, spring 252 unloads and exerts a force on link 232 causing link 232 to rotate in the anterior direction. Link 232 forces links 234, 236, and 238 forward. Link 238 exerts the force from spring 252 on upper leg 54. The force from spring 252 causes torque $\tau_4$ at hip joint 22 that assists user 12 with swing. Therefore, joint torque augmentation system 230 stores passive energy produced by user 12 by hip extension during stance and returns the passive energy to user 12 for hip flexion during swing. The lengths of links 232, 234, 236, and 238 are adjusted to optimize a gear ratio between spring 252 and attachment point 250 on upper leg 24. The total amount of force applied to attachment point 250 was measured to be approximately 20 N and produced a positive metabolic benefit to the user during testing.

Figure 13:
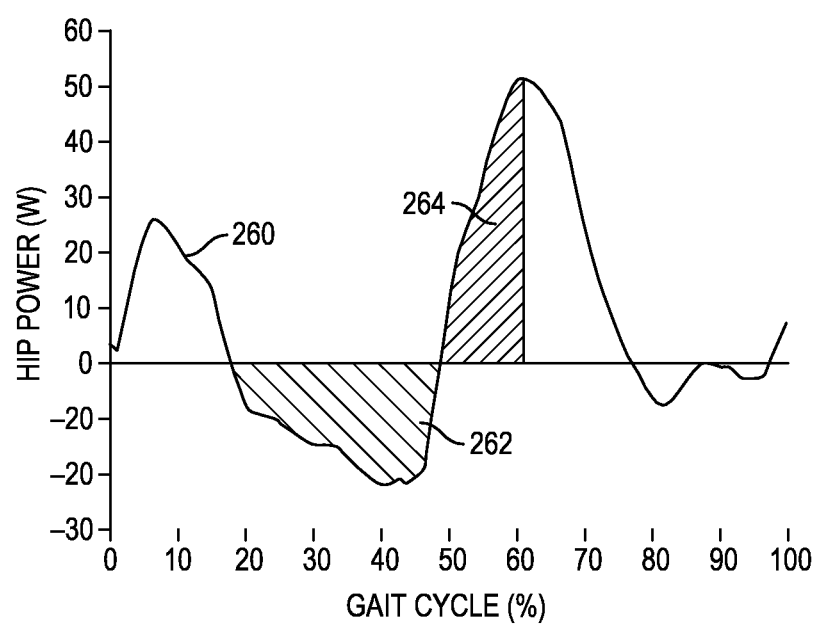
FIG. 13 illustrates a graph of the power stored and returned to the hip by a passive joint torque augmentation system.

FIG. 13 illustrates a graph of the power stored and returned to the hip by a passive joint torque augmentation system. Line 260 represents the power at hip joint 22 during normal gait. Area 262 represents the braking energy stored in spring 252 during stance phase. Area 264 represents the period of swing phase when potential energy stored in spring 252 is released as kinetic energy to assist with hip flexion. Joint torque augmentation system 230 operates to assist with the swing phase of gait without the use of an actuator.

Figure 14:
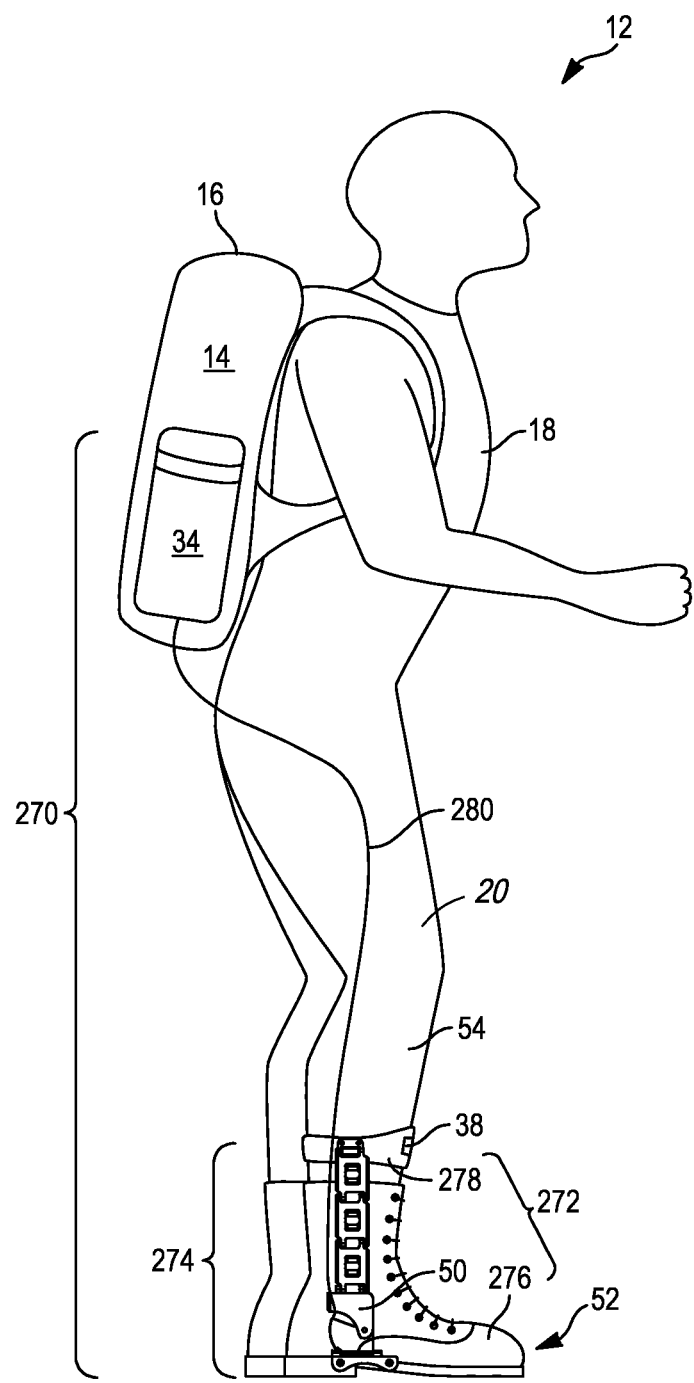
FIG. 14 illustrates a joint torque augmentation system for an ankle joint.

FIG. 14 illustrates a joint torque augmentation system 270 for an ankle joint. Joint torque augmentation system 270 operates as a wearable device for assisting user 12 with the movements associated with human gait. A user may carry a load 14 using a backpack 16 worn on a torso 18 of user 12. Wearing load 14 increases the metabolic requirements for user 12 to move, increases the user's rate of fatigue, and reduces the distance user 12 is able to travel by foot. User 12 wears a joint torque augmentation system 270 in order to add assistive energy to the user's step and reduce the metabolic cost of gait. In one embodiment, joint torque augmentation system 270 is worn on feet 52 in proximity to ankle joint 50 in order to add a force or torque to the ankle joint 50. Adding force or torque at specific timing during the user's gait reduces metabolic energy required from user 12 to produce a gait step. Joint torque augmentation system 270 applies a force or torque near ankle joint 50 during the push off phase of each gait step for each leg 20. Applying torque, for example, at ankle joint 50 during push off assists user 12 with plantarflexion.

Joint torque augmentation system 270 includes an attachment assembly 272, a linkage assembly 274, and a control assembly 34 including an actuator 36 and a sensor 38. A joint torque augmentation system 270 is worn on each leg 20 of user 12. Therefore, user 12 wears one or more joint torque augmentation systems 270 to assist with gait. Each joint torque augmentation system 270 on each leg 20 provides unidirectional force or torque. Attachment assembly 272 and linkage assembly 274 are configured to allow mobility and a natural range or motion for user 12 without encumbering or restricting the user's gait.

Attachment assembly 272 provides for wearability of linkage assembly 274 and control assembly 34 and transfers the forces from control assembly 34 through linkage assembly 274 to the limbs and joints of user 12. In one embodiment, user 12 wears attachment assembly 272 on foot 52 as footwear 276 or coupled to footwear 276. Attachment assembly 272 further includes a strap or cuff 278. In one embodiment, user 12 wears cuff 278 on lower leg 54. Attachment assembly 272 is secured to user 12 at two attachment points, foot 52 and lower leg 54, with ankle joint 50 located in between the two attachment points. Attachment assembly 272 disposed in proximity to ankle joint 50 positions linkage assembly 274 of joint torque augmentation system 270 in order to apply torque at ankle joint 50. Attachment assembly 272 is adjustable in order for joint torque augmentation system 270 to fit onto different users.

Joint torque augmentation system 270 includes a linkage assembly 274, which transfers a force from control assembly 34 into a torque or force directed at a limb or joint of user 12. Linkage assembly 274 is adjustable in order to position the applied torque from joint torque augmentation system 270 at an optimal location on user 12. In one embodiment, linkage assembly 274 includes a pulley system. In another embodiment, linkage assembly 274 includes an assembly of rigid members. In yet another embodiment, linkage assembly 274 includes assembly of rigid members and compliant elements.

Linkage assembly 274 is coupled to control system 34 through cable 280, which is similar to cable 44. In one embodiment, cable 280 is a tension cable surrounded by a compressive sheathing, for example, a Bowden cable. Cable 280 bends and moves with movement of user 12, while the relative location of the ends of cable 280 are independent from ability of control system 34 to produce tension in cable 280. In another embodiment, cable 280 includes multiple cable portions coupled together in series.

Joint torque augmentation system 270 includes a control assembly 34 configured to apply a force or torque to user 12 through linkage assembly 274 and cable 280. Control assembly 34 generally includes an actuator assembly or actuator 36, a controller, and a sensor 38. Sensor 38 is coupled to user 12 and may be attached to a user's torso 18, ankle 50, leg 20, foot 52, or another part of user 12. In one embodiment, sensor 38 is worn on each leg 20 of user 12 and is attached at the lower leg or tibia 54 of each leg 20. Sensor 38 continuously measured a user's movement or inertial information about user 12 to determine information about the user's gait, such as gait speed, stride length, or percent of gait cycle. Control assembly 34 receives and processes the continuous measurements from sensor 38. Control assembly 34 interprets the continuous measurements from sensor 38 and commands a path for actuator 36 to move linkage assembly 274. Control assembly 34 selects a path for actuator 36 according to the inertia or expected movement of user 12 by comparing the continuous measurements from sensor 38 to able-bodied data. The movement of linkage assembly 274 produces an external force that acts on user 12. Control assembly 34 ensures joint torque augmentation system 270 provides an external force that applies torque to ankle joint 50 at proper timing to assist user 12 with gait.

Figure 15A:
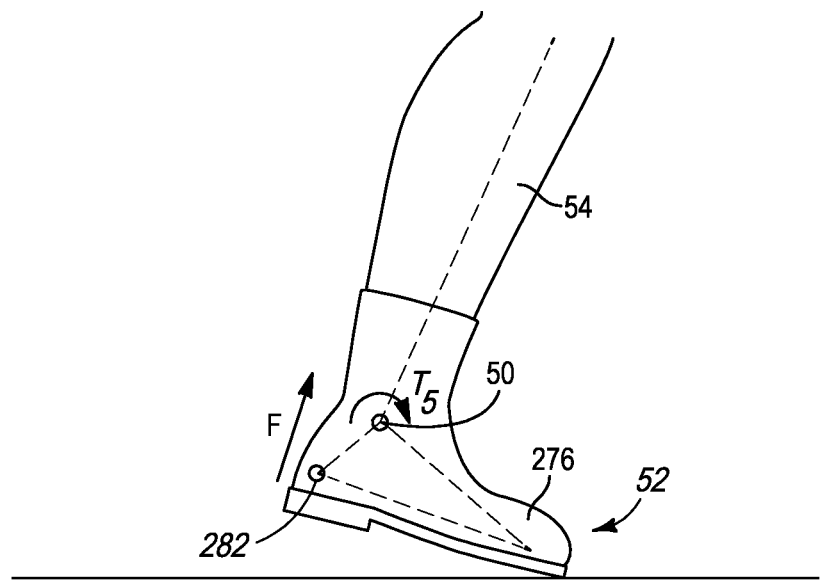
FIGS. 15a-15b illustrate schematic representations of a joint torque augmentation system for an ankle joint.
Figure 15B:
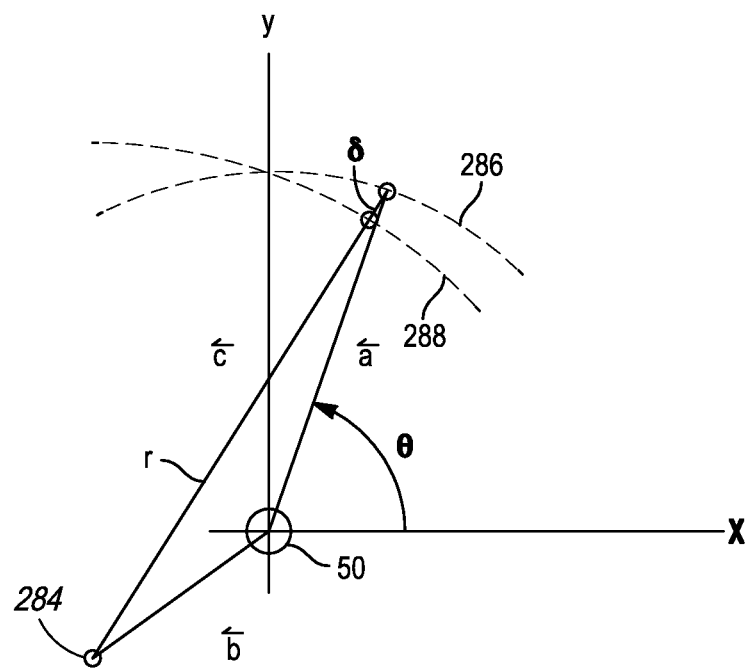

FIGS. 15a-15b illustrate schematic representations of a joint torque augmentation system for an ankle joint. In FIG. 15a, joint torque augmentation system 270 is positioned on user 12 to apply a force F to footwear 276, which transfers force F to foot 52. Torque $\tau_5$ about ankle joint 50 is produced by force F at or near the heel 282 of the foot 52. An anchor point is mounted in proximity to the heel 282 of foot 52 on footwear 276. Cable 280 is attached to the anchor point on footwear 276. In one embodiment, linkage assembly 274 couples to footwear 276 or foot 52 at a single point of contact between the system and the user's foot 52. The simplicity of a single attachment point at the foot minimizes interference of joint torque augmentation system 270 with the user's ankle joint and maximizes the user's available range of motion. A pulling force F generated through the tension in cable 280 by the remotely mounted actuator provides a plantarflexion torque $\tau_5$ at ankle joint 50.

FIG. 15b shows a schematic of joint torque augmentation system 270 at ankle joint 50. Joint torque augmentation system 270 includes a system joint 284 of linkage assembly 274. System joint 284 is not required to align with ankle joint 50. Rather, joint torque augmentation system 270 accounts for misalignment of system joint 284 and ankle joint 50. In one embodiment, system joint 284 and ankle joint 50 are intentionally misaligned. By intentionally misaligning the joints, the order of magnitude and general direction of the misalignment are defined. The additional rotation and translations to accommodate the misalignment are accounted for in the attachment of linkage system 274 to a lower leg 54. Line 286 and line 288 shows a translational error δ as lower leg 54 rotates. Where system joint 284 is disposed low and behind ankle joint 50, translation error δ grows in magnitude as vector $\tilde{a}$, which represents lower leg 54, rotates towards the x-axis. Length r represents the rotational driving link of joint torque augmentation system 270. Vector $\tilde{c}$ represents the mathematical distance between ankle joint 50 and the point of attachment of to lower leg 54.

Vector $\bar{b}$ represents the fixed offset or misalignment system joint 284 from ankle joint 50. Vector $\tilde{a}$, vector $\bar{b}$, and length r are defined, thus vector $\tilde{c}$ and translational error δ is determined using equations (1) and (2).

$$\tilde{c} = \tilde{a} + \bar{b} \qquad (1)$$

$$\delta = r - |c| \qquad (2)$$

If the magnitude of vector $\tilde{a}$ is much greater than the magnitude of vector $\bar{b}$, then the magnitude of translational error δ is much less than length r. For joint torque augmentation system 270, at the limit of the range of motion, the maximum value of translational error δ is approximately 6 mm. Therefore, because the tolerances of human joints can be determined, the magnitude of misalignment of system joint 284 and ankle joint 50 is predictable such that the gear ratios of joint torque augmentation system 270 are adjusted to compensate for the misalignment.

Figure 16C:
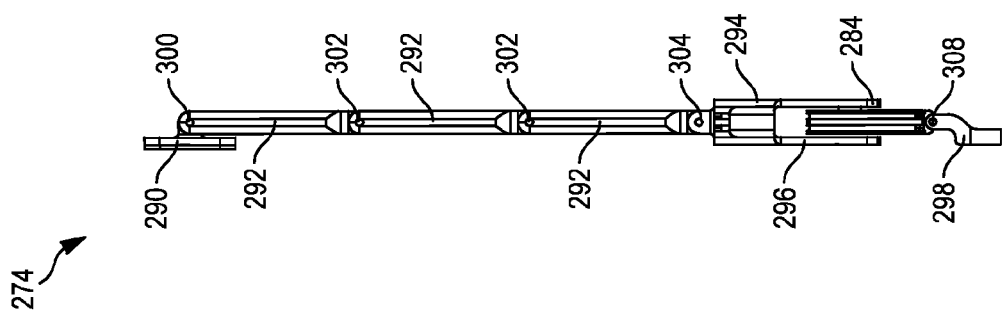
FIGS. 16a-16c illustrate a linkage assembly of a joint torque augmentation system for an ankle joint.
Figure 16B:
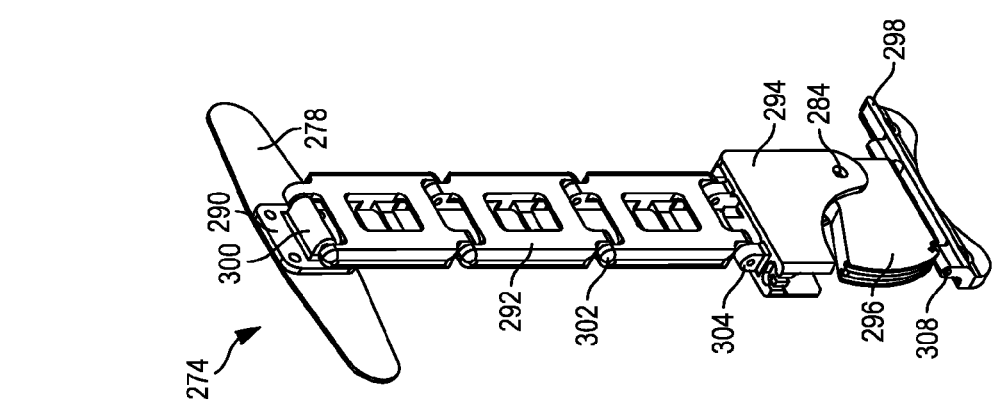
Figure 16A:
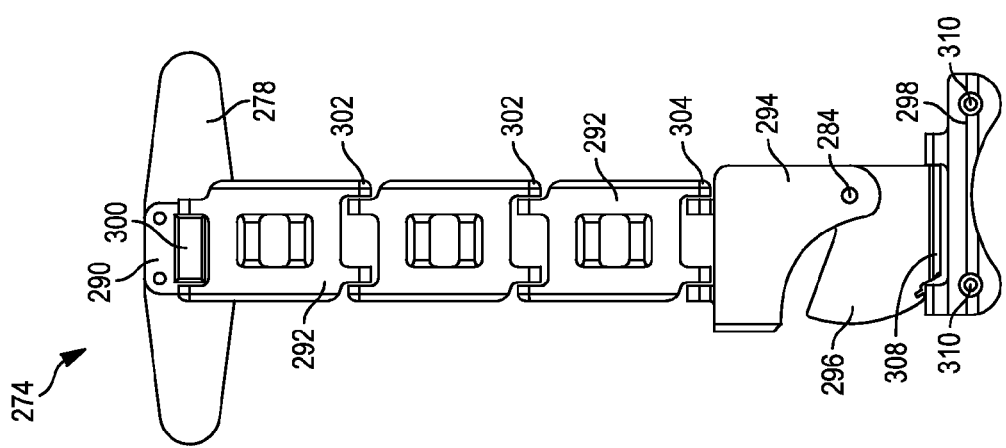

FIGS. 16a-16c illustrate a linkage assembly of a joint torque augmentation system for the ankle joint. FIG. 16a shows a side view of a linkage assembly 274 for joint torque augmentation system 270. Linkage assembly 274 includes cuff attachment 290, support links 292, pulley carriage 294, pulley 296, and boot attachment 298. Each component of linkage assembly 274 may comprise a suitably rigid or flexible material. Linkage assembly 274 components may include a plastic or polymer material such as ABS, PC, PLA, polyamide, nylon, acrylic, PET, PP, PU, PE, UHMW PE, polyimide, PTFE, PVF, PVA, PVC, polystyrene, or other suitable material. Linkage assembly 274 components may also include metal, metal alloy, polymer, fiberglass, carbon fiber, composite, or a natural material.

Cuff 278 operates as a terminal attachment point of linkage assembly 274 for joint torque augmentation system 270. Cuff 278 includes a material that is flexible enough to wrap around lower leg 54, yet rigid enough to withstand a torsional force. In another embodiment, cuff 278 is incorporated into clothing or other wearable items. In yet another embodiment, joint torque augmentation system 270 is coupled to an exoskeleton, frame, or body armor, which is coupled to user 12 or worn by user 12. Cuff 278 is configured to efficiently transfer reaction torques from linkage assembly 274 to user 12. Cuff 278 is adjustable for different torso sizes.

Support links 292 couple to cuff 278 through cuff attachment 290 at joint 300. Cuff attachment 290 operates as a link between attachment assembly 272 and linkage assembly 274. In one embodiment, cuff attachment 290 is adjustable to accommodate different users. In another embodiment, cuff attachment 290 includes a prismatic joint or slip joint that absorbs vertical translation of support links 292 and corrects for misalignment of linkage assembly 274. As a slip joint, joint 112 reduces wear and abrasion on user 12 and further reduces error in joint torque augmentation system 270.

Cuff 278 and pulley carriage 294 are coupled through a plurality of support links 292. The plurality of support links 292 further couple together at joints 302, which are disposed between support links 292. In one embodiment, joints 302 are revolute joints or hinge joints that permit rotation in the coronal plane. Joints 302 permit additional flexion of linkage assembly 274 in the coronal plane to allow for a range of motion of the lower leg, including inversion, eversion, and rotation at the ankle joint. Joints 302 do not reduce the strength of support links 292 in the sagittal plane. Support links 292 are configured to fit additional support members to increase rigidity of support links 292. In one embodiment, support links 292 include a leaf spring disposed vertically through support links 292. In another embodiment, support links 292 include a composite structure or material, which is rigid with respect to the sagittal plane and flexible with respect to the lateral direction or coronal plane. Support links 292 withstand torque in the sagittal plane, while being flexible in the coronal plane. Therefore, as joint torque augmentation system 270 produces a force in the sagittal plane, support links 292 remain substantially rigid.

Pulley carriage 294 is coupled to support links 292 at joint 304 and is coupled to pulley 296 at system joint 284. Pulley carriage 294 rotates around pulley 296 at system joint 284. System joint 284 comprises the primary axis of rotation for joint torque augmentation system 270. System joint 284 is offset with respect to ankle joint 50 to ensure the application of force from joint torque augmentation system 270 results in a torque at ankle joint 50. A cable 280 from FIG. 14 couples to pulley carriage 294 and pulley 296. Pulley carriage 294 and pulley 296 comprise a pulley system that couples to support links 292 and boot attachment 298. Pulley 296 couples to boot attachment 298 at joint 308. Joint 308 includes a revolute, prismatic, screw, spherical, planar, cylindrical, rigid, or other joint type. In one embodiment, joint 308 includes a revolute or hinge joint and provides one degree of freedom by allowing pulley 296 to rotate laterally with respect to boot attachment 298. Boot attachment 298 couples to footwear 276 from FIG. 14 at joints 310. In one embodiment, joints 310 are rigid or fixed joints anchored to footwear 276.

FIG. 16*b* shows an isometric view of linkage assembly 274 of joint torque augmentation system 270. A proximal support link 292 is coupled to cuff attachment 290 at joint 300. Joint 300 includes a revolute, prismatic, screw, spherical, planar, cylindrical, rigid, or other joint type. In one embodiment, ankle joint 308 includes a revolute or hinge joint and provides one degree of freedom by allowing rotation of linkage assembly 274 with respect to cuff 278 in the coronal plane.

A distal support link 292 is coupled to pulley carriage 294 at joint 304. Joint 304 includes a revolute, prismatic, screw, spherical, planar, cylindrical, rigid, or other joint type. In one embodiment, ankle joint 304 includes a revolute or hinge joint and provides one degree of freedom by allowing support links 292 to rotate with respect to pulley carriage 294 in the coronal plane. Joint torque augmentation system 270 including joints 304 and 308 permit a full range of lateral motion at ankle joint 50. Linkage assembly 274 also permits rotation at ankle joint 50. User 12 is permitted a substantially unencumbered range of motion in the sagittal and coronal planes while wearing joint torque augmentation system 270.

FIG. 16*c* shows a front view of linkage assembly 274 of joint torque augmentation system 270. Linkage assembly 274 is shown with support links 292 aligned with pulley carriage 294 and pulley 296. Joints 300, 302, 304, and 308 provide a lateral range of motion of user by allowing linkage assembly 274 to flex in the coronal plane.

FIGS. 17*a*-17*b* illustrate a joint torque augmentation system worn at a user's ankles in more detail. In FIG. 17*a*, a side view of joint torque augmentation system 270 from FIG. 14 is shown in more detail. Joint torque augmentation system 270 includes attachment assembly 272, linkage assembly 274, and a control assembly, such as control assembly 34 from FIGS. 6*a*-6*c*. Attachment assembly 272 couples linkage assembly 274 to user 12. Control assembly 34 applies a force or torque to user 12 through cable 280 and linkage assembly 274. Linkage assembly 274 transfers a force from control assembly 34 into a torque or force directed at a limb or joint of user 12. In one embodiment, linkage assembly 274 includes a pulley system, which includes pulley carriage 294, pulley 296, and cable 280. Pulley carriage 294 couples to pulley 296 and rotates around pulley 296 at system joint 284. System joint 284 aligns in proximity to ankle joint 50, but is offset from ankle joint 50 to produce a torque at ankle joint 50.

A cable 280 couples to pulley carriage 294 and pulley 296. Cable 280 couples to pulley carriage 294 by fastener 312. In one embodiment, fastener 312 includes a quick disconnect to allow cable 280 to disconnect from pulley carriage 294 for easy donning and doffing of joint torque augmentation system 270. Fastener 312 positions cable 280 on pulley carriage 294 such that cable 280 is directed around pulley 296. In one embodiment, fastener 312 includes a tension adjustment. Fastener 312 operates as a screw adjustment that is manually turned to adjust the tension of cable 280. Fastener 312 operates as fine tensioning for cable 280. Cable 280 is further disposed around pulley 296. A first end of cable 280 couples to pulley 296. In one embodiment, cable 280 couples to pulley 296 by a quick disconnect fastener.

A control assembly 34 from FIGS. 6*a*-6*c* is coupled to pulley 296 of linkage assembly 274 through cable 280. Control assembly 34 can be mounted remotely with respect to the location of linkage assembly 274. In one embodiment, control assembly 34 is carried in backpack 16 or coupled externally to user 12. By coupling control assembly 34 to the torso 18 of user 12, rather than to legs 20, the weight of control assembly 34 is positioned for better gait dynamics than if control assembly was mounted to legs 20. Additional weight on the legs is avoided and joint torque augmentation system 270 performs better by further reducing metabolic cost and is more comfortable for user 12 to wear. Alternatively, control assembly 34 is mounted on a leg 20 of user 12 or at any point of attachment on user 12. In another embodiment, control assembly 34 is coupled to an exoskeleton, frame, or body armor, which is coupled to user 12 or worn by user 12.

Pulley 296 is coupled to footwear 276 at boot attachment 298. Boot attachment 298 operates as the primary link for transferring torque from cable 280 and pulley 296 to the user's ankle joint 50. Boot attachment 298 is rigidly coupled to footwear 276 at joints 310. Cable 280 produces a tension force on pulley 296. The force on pulley 296 is transferred through boot attachment 298 to footwear 276. Through the force on boot attachment 298, joint torque augmentation system 270 adds torque to ankle joint 50 and assists user 12 in plantarflexion.

In FIG. 17*b*, a side view of joint torque augmentation system 270 from FIG. 14 is shown in more detail. Control system 34 producing tension on cable 280 produces a unidirectional torque on user 12. Joint torque augmentation system 270 produces an assistive torque in a first direction, while cable 280 is in tension. Joint torque augmentation system 270 allows unencumbered movement in a second direction opposite the first direction, while cable 280 is slack. By nature of the cable-based linkage, joint torque augmentation system 270 provides unidirectional joint torque augmentation. Joint torque augmentation system 270 adds torque to ankle joint 50 of user 12 to aid in the push off phase of gait. The augmentation of ankle joint torque assists user 12 with carrying a heavy load or enhances the overall strength of user 12 during gait.

Figure 18A:
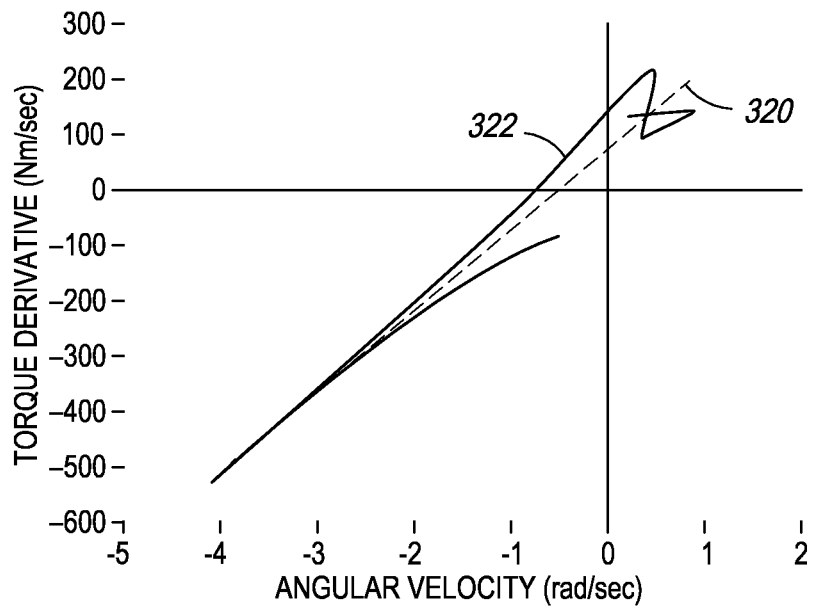
FIGS. 18a-18c illustrate graphs of the performance of a joint torque augmentation system for an ankle.
Figure 18B:
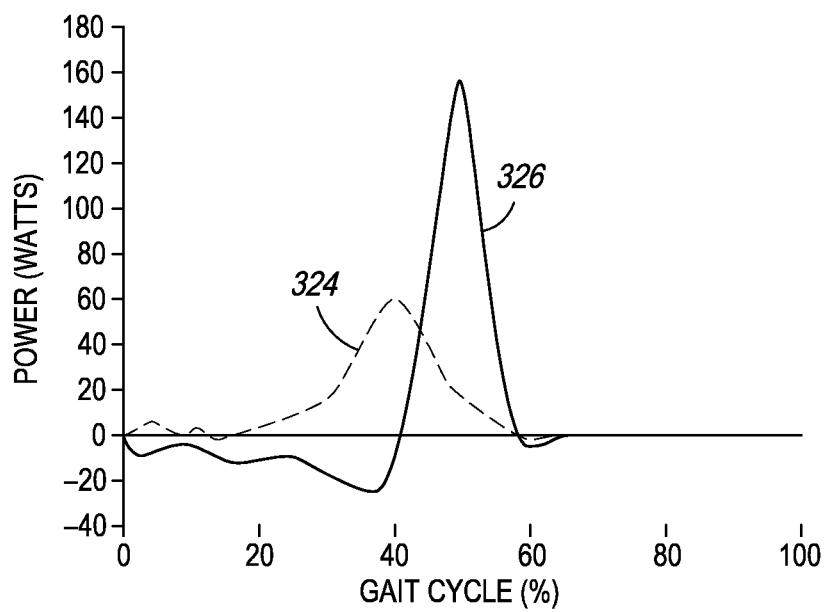
Figure 18C:
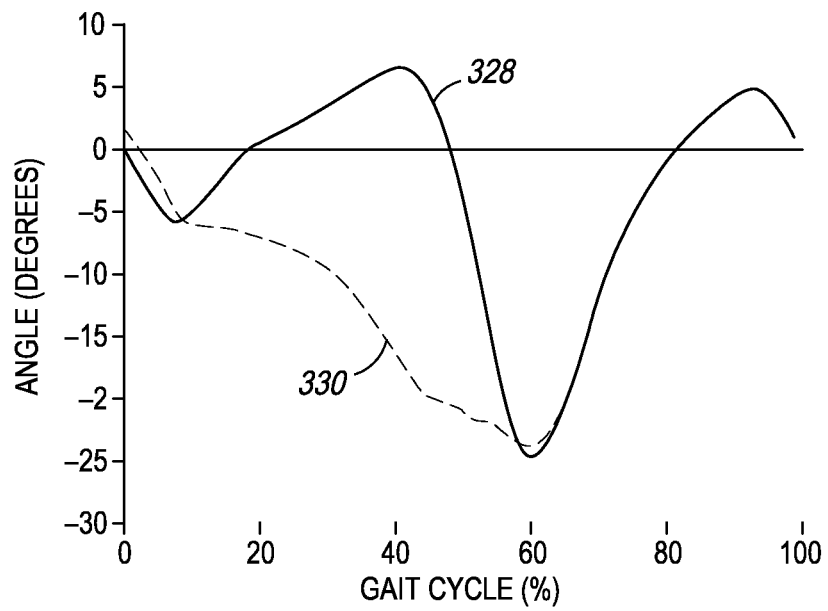

FIGS. 18a-18c illustrate graphs of the performance of a joint torque augmentation system for an ankle. FIG. 18a shows an analysis of joint torque augmentation system 270 having a dynamic stiffness. Line 320 represents linear stiffness. Line 322 shows the dynamic stiffness of joint torque augmentation system 270 tuned for a load 14 of 45 kg. The dynamic stiffness of joint torque augmentation system 270 is selected to minimize the power usage by actuator 36 of control system 34.

FIG. 18b shows the power requirements for control system 34 for joint torque augmentation system 270. Line 326 represents the power required to produce normal ankle gait. For a control system without a compliant element 100, line 326 also represents the power required from actuator 36 to produce normal gait. The peak power required for ankle gait is approximately 160 W. Line 326 represents the power required from actuator 36 of control system 34 for joint torque augmentation system 270, including compliant element 100, in order to produce normal ankle gait. Compliant element 100 reduces the power required from actuator 36. In joint torque augmentation system 270, the peak output power of actuator 36 is 60.1 W for joint torque augmentation system 270 having dynamic stiffness of 146 Newton-meters per radian (Nm/rad). The average power output for actuator 36 is 13.1 Joules per gait step.

FIG. 18c shows the path of actuator 36 of control system 34 for joint torque augmentation system 270. Line 328 represents ankle position for able-bodied gait. For a control system without a compliant element 100, line 328 also represents the control path that actuator 36 follows to produce normal gait. Line 330 represents the path for actuator 36 in a control system 34 that includes compliant element 100. Actuator 36 acts through compliant element 100 to deflect compliant element 100 to produce the force on cable 280 and assist with push-off. The area between lines 328 and 330 represent the deflection of compliant element 100. The stiffness of compliant element 100 is selected to optimize the motor path, line 330, to achieve a minimum peak power required from actuator 36.

Figure 19:
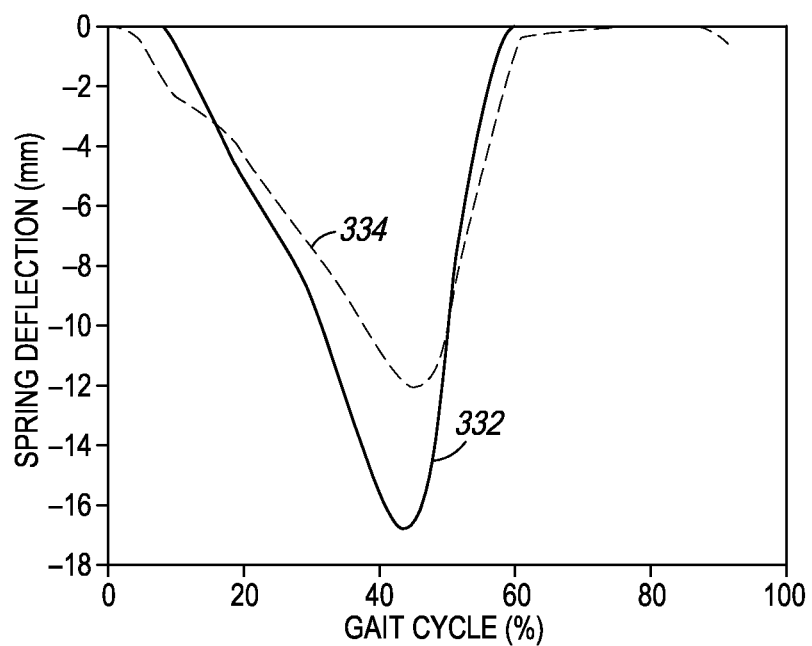
FIG. 19 illustrates a graph of the spring deflection of the compliant element of an ankle joint torque augmentation system.

FIG. 19 a graph of the spring deflection of compliant element 100 of joint torque augmentation system 270. Line 332 represents the expected deflection compliant element 100 during a gait cycle. Line 334 represents experimental results of the deflection of compliant element 100 during actual use. Line 334 shows that less force was required from compliant element 100 than expected. Results also showed that 40 Newton meters (Nm) of torque was delivered to ankle joint 50 during the gait cycle plotted as line 334. The average power required from actuator 36 during the gait cycle was 23 W. The peak power of actuator 36 during the gait cycle was 80 W. The joint torque augmentation system 270 has shown metabolic improvement of up to 20% during testing.

Figure 20A:
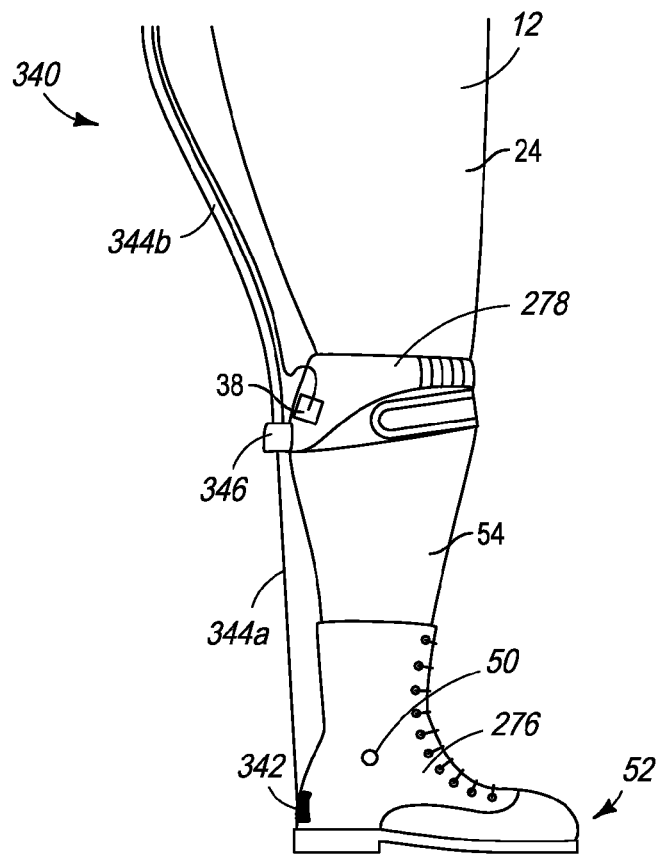
FIGS. 20a-20b illustrate an alternative joint torque augmentation system for an ankle joint.
Figure 20B:
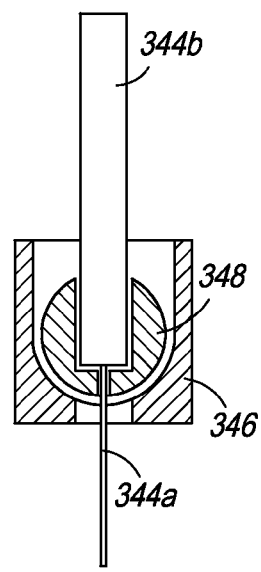

FIGS. 20a-20b illustrate an alternative joint torque augmentation system for an ankle joint. FIG. 20a shows a joint torque augmentation system 340 for an ankle joint. Joint torque augmentation system 340 operates as a wearable device for assisting user 12 with the movements associated with human gait. User 12 wears a joint torque augmentation system 340 in order to add assistive energy to the user's step and reduce the metabolic cost of gait. In one embodiment, joint torque augmentation system 340 is worn on lower legs 54 and feet 52 in proximity to ankle joint 50 of user 12 in order to add a force or torque to the ankle joint 50. Adding force or torque at specific timing during the user's gait reduces metabolic energy required from user 12 to produce a gait step. In one embodiment, joint torque augmentation system 340 applies a force or torque near ankle joint 50 of user 12 during the push off phase of each gait step for each leg 20. Applying torque, for example, at ankle joint 50 during push off assists user 12 with plantarflexion.

Attachment cuff 278 is coupled to lower leg 54 of user 12. An anchor 342 is coupled to footwear 276. Anchor 342 is disposed in proximity to ankle joint 50 and is positioned to apply torque at ankle joint 50. In one embodiment, anchor 342 is disposed on a heel of footwear 276. Cable 344 is coupled to anchor 342. In one embodiment, cable 344 is a tension cable surrounded by a compressive sheathing, for example, a Bowden cable. Cable 344 includes a tension portion 344a coupled between a termination cup 346 and anchor 342. Cable portion 344b includes a first end coupled to a control system, such as control system 34, and includes a second end coupled to termination cup 346.

FIG. 20b shows further detail of termination cup 346. Cable portion 344b terminates at termination cup 346. A joint 348 is attached to the terminal end of cable portion 344b. In one embodiment, joint 348 includes a spherical joint or a ball and socket joint. A contoured inner surface of termination cup 346 matches the pivoting sphere of joint 348. Joint 348 provides three degrees of freedom between cable portion 344b and cuff 378. Termination cup 346 and joint 348 allows a complete range of motion at ankle joint 50 while providing assistive torque during gait.

Figure 21A:
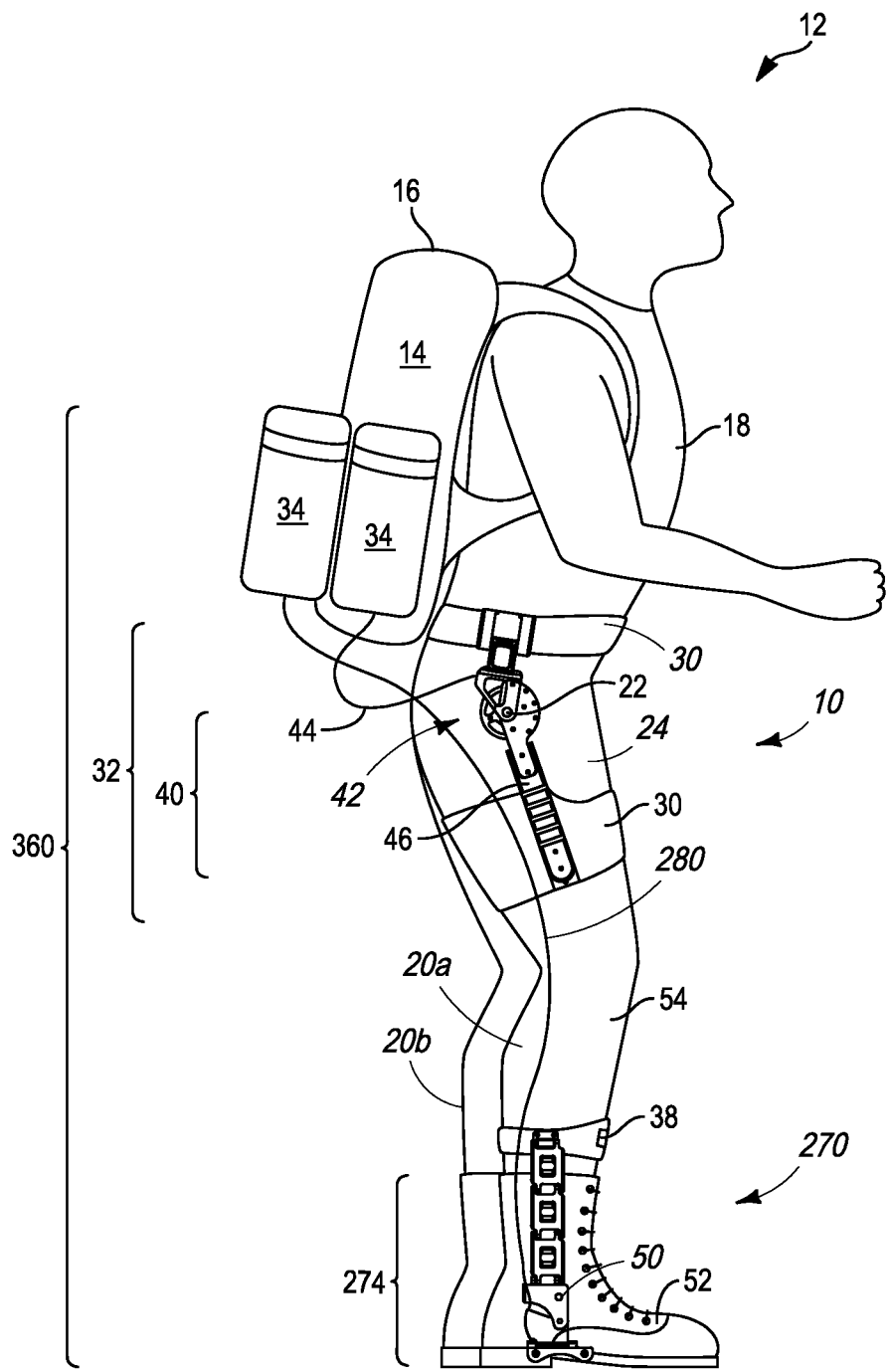
FIGS. 21a-21d illustrate a joint torque augmentation system for an ankle joint and a hip joint.

FIGS. 21a-21d illustrate a joint torque augmentation system for an ankle joint and a hip joint. FIG. 21a shows joint torque augmentation system 360 worn at a hip joint 22 and ankle joint 50. Joint torque augmentation system 360 includes a hip joint torque augmentation device, such as joint torque augmentation device 10, and an ankle joint torque augmentation device, such as joint torque augmentation system 270. Joint torque augmentation system 360 operates as a wearable device for assisting user 12 with the movements associated with human gait. A user may carry a load 14 using a backpack 16 worn on a torso 18 of user 12. Wearing load 14 increases the metabolic requirements for user 12 to move, increases the user's rate of fatigue, and reduces the distance user 12 is able to travel by foot. User 12 wears a joint torque augmentation system 360 in order to add assistive energy to the user's step and reduce the metabolic cost of gait. In one embodiment, joint torque augmentation system 360 is worn on feet 52 and hips 22 in order to add a force or torque to ankle joint 50 and hip joint 22.

Adding force or torque at specific timing during the user's gait reduces metabolic energy required from user 12 to produce a gait step. Joint torque augmentation system 360 applies a force or torque near ankle joint 50 of user 12 during the push off phase of each gait step for each leg 20. Applying torque, for example, at ankle joint 50 during push off assists user 12 with plantarflexion. Joint torque augmentation system 360 also applies a force or torque near each hip joint 22 of user 12 during the swing phase each gait step for each leg 20.

A joint torque augmentation system 360 is worn on each leg 20 of user 12. Therefore, user 12 wears one or more joint torque augmentation systems 360 to assist with gait. Each joint torque augmentation system 360 on each leg 20 provides unidirectional force or torque. Alternatively, joint torque augmentation system 360 may produce a bidirectional force or torque at hip joint 22. Joint torque augmentation system 360 is configured to allow mobility and a natural range or motion for user 12 without encumbering the user's gait.

Figure 21B:
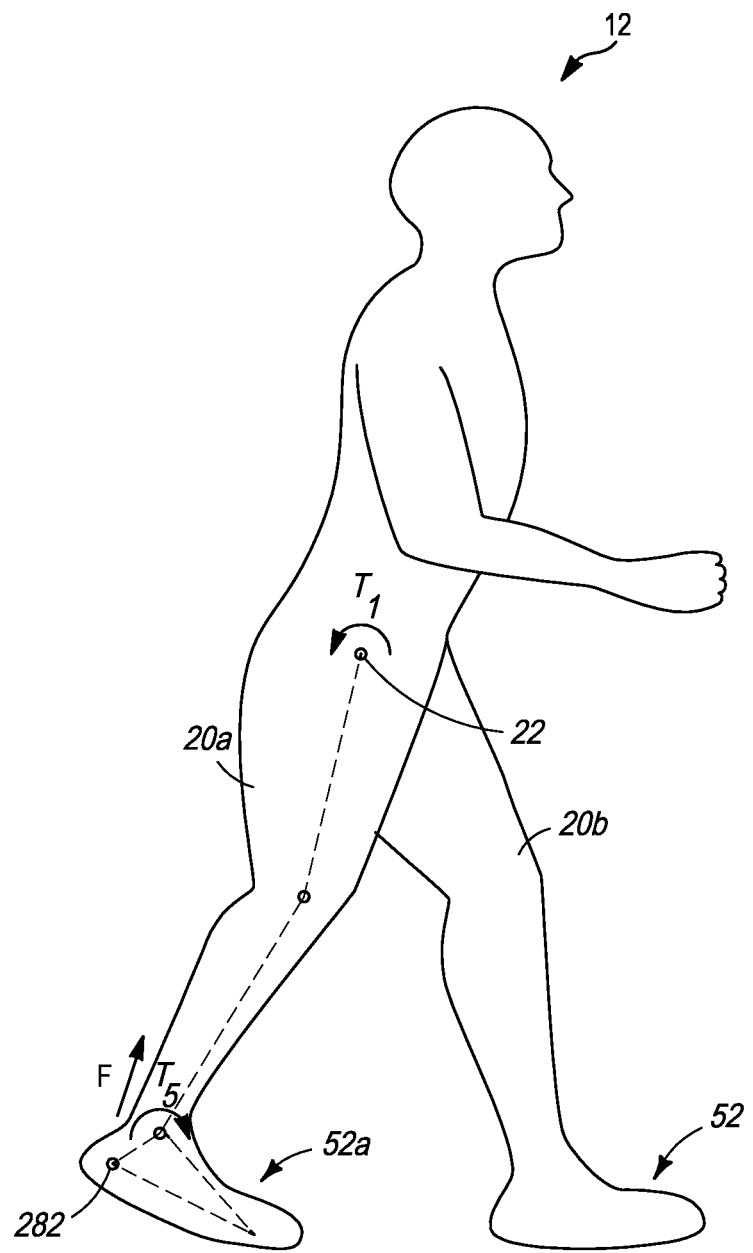

FIG. 21b shows a schematic representation of joint torque augmentation system 360. Joint torque augmentation system 360 is positioned on user 12 to produce a torque $\tau_1$ at right hip joint 22a that is timed with the user's step. At the end of stance phase for the user's right leg 20a, both of the user's feet 52 are in contact with the ground. User 12 has completed the push off phase of gait with the right foot 52a, and the right foot 52a is about to lift from the ground. The right hip is extended and user 12 begins to flex the right hip to swing right leg 20a forward. As user 12 flexes the right hip and enters swing phase, control assembly 34 commands actuator 36 to follow a command path or position. The position of actuator 36 results in a force or torque applied to right leg 20a and right hip joint 22a. The result of the force or torque applied by joint torque augmentation system 360 is a torque $\tau_1$ acting at right hip joint 22a. Torque $\tau_1$ is applied to user 12 in the sagittal plane in the direction of the arrow shown in FIG. 21b and assists user 12 with hip flexion. A second joint torque augmentation system 360 is worn on left leg 20b to provide a torque, similar to torque $\tau_1$, acting on left hip joint 22b during swing phase of left leg 20b. In another embodiment, joint torque augmentation system 360 is configured to provide an assistive force or torque during both stance phase and swing phase.

Joint torque augmentation system 360 is positioned on user 12 to apply a force F to foot 52. Torque $\tau_5$ about ankle joint 50 is produced by force F at or near heel 282 of the foot 52. An anchor point is mounted in proximity to heel 282 of foot 52 on footwear 276. Cable 280 is attached to the anchor point on footwear 276. In one embodiment, linkage assembly 274 couples to footwear 276 or foot 52 at a single point of contact between the system and the user's foot. The simplicity of a single attachment point at the foot minimizes interference of joint torque augmentation system 360 with the user's ankle joint and maximizes the user's available range of motion. A pulling force F generated through the tension in cable 280 by the remotely mounted actuator provides a plantarflexion torque $\tau_5$ at ankle joint 50.

Figure 21C:
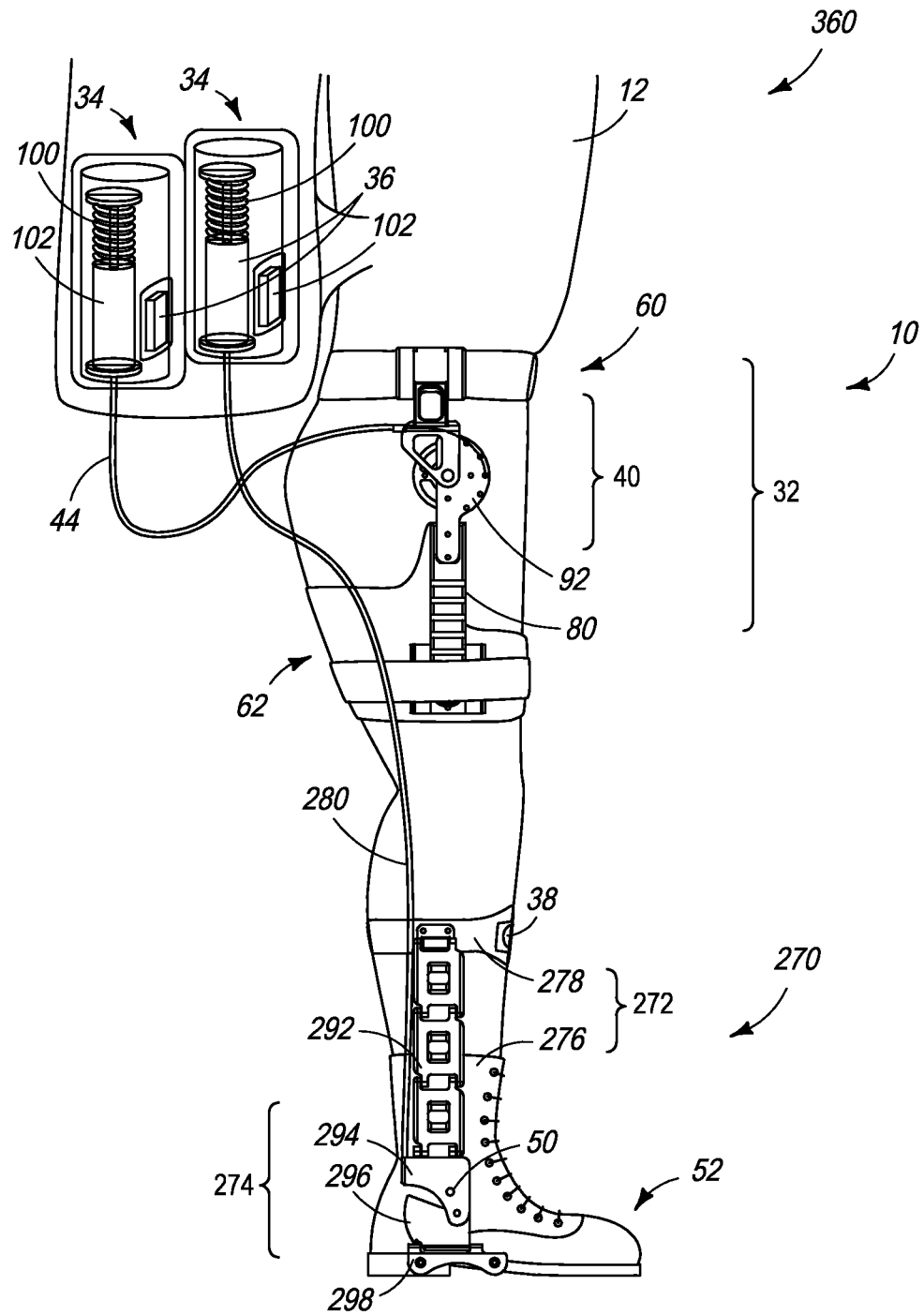

FIG. 21c shows a side view of joint torque augmentation system 360. Joint torque augmentation system 360 includes a joint torque augmentation system 10 worn on each hip and a joint torque augmentation system 270 worn on each ankle.

Joint torque augmentation system 360 includes attachment assembly 30 disposed in proximity to hip joint 22 to position linkage assembly 32 of joint torque augmentation system 360 in order to apply torque at hip joint 22. Joint torque augmentation system 360 includes linkage assembly 32 with pulley system 40 coupled to thigh link 80. A cable 44 couples to outer pulley 92 to control system 34. As actuator 36 engages to pull on cable 44, cable 44 exerts a force on outer pulley 92 to produce a torque around at the hip. Outer pulley 92 rotates and produces a force on thigh link 80. Thigh link 80 being rigidly connected to outer pulley 92 is pulled in the direction of hip flexion. The force or torque on thigh link 80 from outer pulley 92 is transferred to thigh attachment 62. Thigh attachment 62 distributes the force over the surface area of attachment 62, which is in contact with the user's thigh 24. The force directed at the user's thigh 24 assists with hip flexion. Accordingly, joint torque augmentation system 360 operates through linkage assembly 32 to provide hip joint torque augmentation in the sagittal plane.

Joint torque augmentation system 360 further includes a joint torque augmentation system 270 coupled to each ankle. Joint torque augmentation system 360 includes attachment assembly 272, linkage assembly 274, and a control assembly 34. Attachment assembly 272 couples linkage assembly 274 to user 12. Control assembly 34 applies a force or torque to user 12 through cable 280 and linkage assembly 274. Linkage assembly 274 transfers a force from control assembly 34 into a torque or force directed at a limb or joint of user 12. In one embodiment, linkage assembly 274 includes a pulley system, which includes pulley carriage 294, pulley 296, and cable 280.

Cable 280 couples to pulley carriage 294 and pulley 296. A control assembly 34 is coupled to pulley 296 of linkage assembly 274 through cable 280. Pulley 296 is coupled to footwear 276 at boot attachment 298. Boot attachment 298 operates as the primary link for transferring torque from cable 280 and pulley 296 to the user's ankle joint 50. Boot attachment 298 is rigidly coupled to footwear 276 at joints 310. Cable 280 produces a tension force on pulley 296. The force on pulley 296 is transferred through boot attachment 298 to footwear 276. Through the force on boot attachment 298, joint torque augmentation system 360 adds torque to ankle joint 50 and assists in plantarflexion.

Control assembly 34 is mounted remotely with respect to the location of linkage assemblies 32 and 274. By coupling control assemblies 34 to the torso 18 of user 12, rather than to legs 20, the weight of control assemblies 34 is positioned for better gait dynamics than if control assembly was mounted to legs 20. Additional weight on the legs is avoided and joint torque augmentation system 360 performs better by further reducing metabolic cost and is more comfortable for user 12 to wear. Alternatively, control assembly 34 is mounted on a leg 20 of user 12 or at any point of attachment on user 12. In another embodiment, control assembly 34 is coupled to an exoskeleton, frame, or body armor, which is coupled to user 12 or worn by user 12.

Figure 21D:
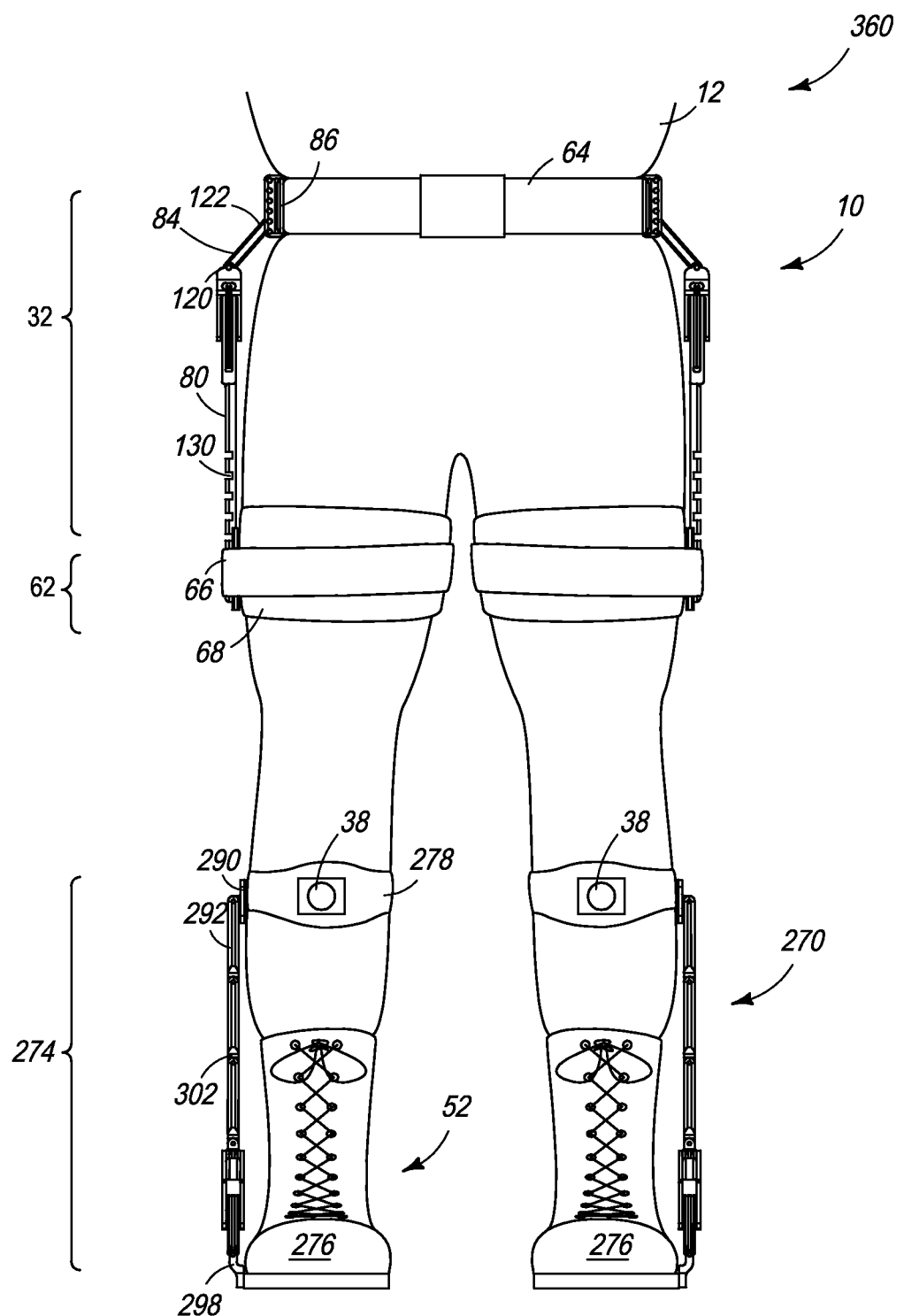

FIG. 21d shows a front view of joint torque augmentation system 360. Linkage assemblies 32 and 274 are configured to allow mobility and a natural range or motion for user 12 without encumbering or restricting the user's gait. Linkage assemblies 32 and 274 include a combination of rigid, compliant, or unidirectional links that transmit a force from control assembly 34 to hip joint 22 and ankle joint 50. Joint torque augmentation system 360 operates through linkage assemblies 32 and 274 to provide hip joint torque augmentation in the sagittal plane. Linkage assembly 32 allows for hip extension and flexion in the sagittal plane and hip adduction and abduction in the coronal plane. Linkage assembly 274 provides ankle joint torque augmentation in the sagittal plane. Linkage assembly 274 is flexible in the coronal plane to allow for a range of motion of the lower leg, including inversion, eversion, and rotation at the ankle joint. Support links 292 withstand torque in the sagittal plane, while being flexible in the coronal plane. Therefore, user 12 is permitted a substantially unencumbered range of motion in the sagittal and coronal planes while wearing joint torque augmentation system 360.

While one or more embodiments of the present invention have been illustrated in detail, the skilled artisan will appreciate that modifications and adaptations to those embodiments may be made without departing from the scope of the present invention as set forth in the following claims.

What is claimed:
1. A method of making a joint torque augmentation device, comprising:
    providing a first securing belt configured to attach to a first portion of a user body;
    providing a second securing belt configured to attach to a second portion of the user body;

providing a linkage assembly coupled between the first securing belt and second securing belt, the linkage assembly including,
(a) an offset adjustment link including a first end connected to the first securing belt,
(b) a pulley assembly rotatable about a central joint and connected to a second end of the offset adjustment link opposite the first securing belt, and
(c) a rigid support link coupled between the pulley assembly and second securing belt, wherein the offset adjustment link provides variable separation between the user body and the pulley assembly and rigid support link, and wherein the offset adjustment link allows for full range of motion in the coronal plane; and
disposing a motor remote from the linkage assembly and coupled through a cable to the pulley assembly to apply a torque through the rigid support link to the user body.

2. The method of claim 1, wherein the motor includes:
providing an actuator coupled to the cable; and
providing a compliant member coupled to the actuator.

3. The method of claim 2, further including disposing a sensor proximate to the user body to measure an attribute of the user body.

4. The method of claim 2, further including operating the actuator based on the movement of the user body.

5. The method of claim 1, further including disposing a support panel over the second portion of the user body.

6. The method of claim 1, wherein the pulley assembly includes:
providing an inner pulley rotatable about the central joint;
disposing an outer pulley over the inner pulley and coupled to the cable to be rotatable about the central joint; and
disposing a pulley cable support over the outer pulley, wherein the pulley cable support is connected to the second end of the offset adjustment link with an opening for the central joint and the outer pulley is rotatable in response to the cable about the central joint to apply the torque through the rigid support link to the user body.

7. A method of making a joint torque augmentation device, comprising:
providing a first securing mechanism configured to attach to a first portion of the user body;
providing a second securing mechanism configured to attach to a second portion of the user body;
providing a linkage assembly coupled between the first securing mechanism and second securing mechanism, the linkage assembly including,
(a) an adjustment link connected to the first securing mechanism,
(b) a pulley assembly rotatable about a central joint and connected to the adjustment link, and
(c) a support link coupled between the pulley assembly and second securing mechanism, wherein the adjustment link provides variable separation between the user body and the pulley assembly and support link, and wherein the adjustment link allows for full range of motion in the coronal plane.

8. The method of claim 7, further including disposing a motor remote from the linkage assembly and coupled through a cable to the pulley assembly to apply a torque through the support link to the user body.

9. The method of claim 8, wherein the motor includes:
providing an actuator coupled to the cable; and
providing a compliant member coupled to the actuator.

10. The method of claim 7, further including disposing a support panel over the second portion of the user body.

11. The method of claim 7, wherein the pulley assembly includes:
providing an inner pulley rotatable about the central joint;
disposing an outer pulley over the inner pulley and coupled to the cable to be rotatable about the central joint; and
disposing a pulley cable support over the outer pulley, wherein the pulley cable support is connected to the adjustment link with an opening for the central joint and the outer pulley is rotatable in response to the cable about the central joint to apply the torque through the support link to the user body.

12. The method of claim 11, wherein the outer pulley includes a plurality of openings for selecting a cable attachment point.

13. The method of claim 7, wherein the pulley assembly includes:
providing a pulley rotatable about the central joint; and
disposing a pulley carriage over the pulley and coupled to the cable, wherein the pulley is rotatable about the central joint to apply the torque through the support link to the user body.

14. A joint torque augmentation device, comprising:
a first securing belt configured to attach to a first portion of a user body;
a second securing belt configured to attach to a second portion of the user body; and
a linkage assembly coupled between the first securing belt and second securing belt, the linkage assembly including,
(a) an offset adjustment link including a first end connected to the first securing belt,
(b) a pulley assembly rotatable about a central joint and connected to a second end of the offset adjustment link opposite the first securing belt, and
(c) a rigid support link coupled between the pulley assembly and second securing belt, wherein the offset adjustment link provides variable separation between the user body and the pulley assembly and rigid support link, and wherein the offset adjustment link allows for full range of motion in the coronal plane.

15. The joint torque augmentation device of claim 14, further including a motor disposed remote from the linkage assembly and coupled through a cable to the pulley assembly to apply a torque through the rigid support link to the user body.

16. The joint torque augmentation device of claim 14, further including a sensor disposed proximate to the user body to measure an attribute of the user body.

17. The joint torque augmentation device of claim 14, further including a support panel disposed over the second portion of the user body.

18. The joint torque augmentation device of claim 14, wherein the pulley assembly includes:
an inner pulley rotatable about the central joint;
an outer pulley disposed over the inner pulley and coupled to the cable to be rotatable about the central joint; and
a pulley cable support disposed over the outer pulley, wherein the pulley cable support is connected to the second end of the offset adjustment link with an opening for the central joint and the outer pulley is rotatable in response to the cable about the central joint to apply the torque through the rigid support link to the user body.

19. The joint torque augmentation device of claim 18, wherein the outer pulley includes a plurality of openings for selecting a cable attachment point.

20. A joint torque augmentation device, comprising:
- a first securing mechanism configured to attach to a first portion of the user body;
- a second securing mechanism configured to attach to a second portion of the user body;
- a linkage assembly coupled between the first securing mechanism and second securing mechanism, the linkage assembly including,
  - (a) an adjustment link connected to the first securing mechanism,
  - (b) a pulley assembly rotatable about a central joint and connected to the adjustment link, and
  - (c) a support link coupled between the pulley assembly and second securing mechanism, wherein the adjustment link provides variable separation between the user body and the pulley assembly and support link, and wherein adjustment link allows for full range of motion in the coronal plane.

21. The joint torque augmentation device of claim 20, further including a motor disposed remote from the linkage assembly and coupled through a cable to the pulley assembly to apply a torque through the support link to the user body.

22. The joint torque augmentation device of claim 20, wherein the pulley assembly includes:
- an inner pulley rotatable about the central joint;
- an outer pulley disposed over the inner pulley and coupled to the cable to be rotatable about the central joint; and
- a pulley cable support disposed over the outer pulley, wherein the pulley cable support is connected to the adjustment link with an opening for the central joint and the outer pulley is rotatable in response to the cable about the central joint to apply the torque through the support link to the user body.

23. The joint torque augmentation device of claim 22, wherein the outer pulley includes a plurality of openings for selecting a cable attachment point.

24. The joint torque augmentation device of claim 20, wherein the pulley assembly includes:
- a pulley rotatable about the central joint; and
- a pulley carriage disposed over the pulley and coupled to the cable, wherein the pulley is rotatable about the central joint to apply the torque through the support link to the user body.

* * * * *